(12) United States Patent
Blyumen

(10) Patent No.: US 9,740,376 B2
(45) Date of Patent: Aug. 22, 2017

(54) USER INTERFACE FOR RELATING ENTERPRISE INFORMATION WITH PUBLIC INFORMATION USING A PRIVATE USER PROFILE AND SCHEMA

(71) Applicant: Oracle International Corporation, Redwood Shores, CA (US)

(72) Inventor: Julia Blyumen, Scotts Valley, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 277 days.

(21) Appl. No.: 14/310,561

(22) Filed: Jun. 20, 2014

(65) Prior Publication Data

US 2014/0379699 A1    Dec. 25, 2014

Related U.S. Application Data

(60) Provisional application No. 61/838,054, filed on Jun. 21, 2013, provisional application No. 61/838,056, filed on Jun. 21, 2013.

(51) Int. Cl.
| | |
|---|---|
| *G06F 17/30* | (2006.01) |
| *G06F 3/0484* | (2013.01) |
| *G06F 3/0485* | (2013.01) |

(52) U.S. Cl.
CPC ......... *G06F 3/0484* (2013.01); *G06F 3/0485* (2013.01); *G06F 3/04842* (2013.01); *G06F 17/30867* (2013.01); *G06F 17/30893* (2013.01)

(58) Field of Classification Search
CPC ............... G06F 17/30867; G06F 17/30893
See application file for complete search history.

(56) References Cited

U.S. PATENT DOCUMENTS

| | | |
|---|---|---|
| 6,448,987 B1 | 9/2002 | Easty et al. |
| 6,750,864 B1 | 6/2004 | Anwar |

(Continued)

OTHER PUBLICATIONS

"annular, adj.", OED Online. Dec. 2015. Oxford University Press. Http://www.oed.com/view/Entry/7964?redirectedFrom+annular (accessed Dec. 13, 2015).

(Continued)

*Primary Examiner* — Kris Mackes
(74) *Attorney, Agent, or Firm* — Vista IP Law Group, LLP

(57) ABSTRACT

Methods, systems, and computer program product for forming relationships between enterprise data and publically-accessible information are disclosed. Embodiments commence upon accessing a private user profile from a private data area and determining a role and/or access privilege from the user profile. The user profile is used to form queries, and to retrieve enterprise data from an enterprise data repository. Aspects of retrieved enterprise data are then used to determine at least one public information source, from which is retrieved at least some publically-accessible information to be combined with information from the enterprise data repository and displayed to a user. Portions of the retrieved enterprise data are presented in a first display area and portions of the publically-accessible information are displayed in a proximal second display area. Relationships between information from the enterprise data repository and the publically-accessible information are formed. Structured data and unstructured data are combined in the display.

19 Claims, 17 Drawing Sheets

(56) References Cited

U.S. PATENT DOCUMENTS

| | | | |
|---|---|---|---|
| 8,332,782 | B1 | 12/2012 | Chang et al. |
| 2003/0197740 | A1 | 10/2003 | Reponen |
| 2004/0236714 | A1* | 11/2004 | Eisenberger ...... G06F 17/30528 |
| 2005/0246331 | A1 | 11/2005 | De Vorchik |
| 2006/0161871 | A1 | 7/2006 | Hotelling |
| 2007/0005477 | A1 | 1/2007 | McAtamney |
| 2007/0123204 | A1 | 5/2007 | Inukai |
| 2007/0198949 | A1 | 8/2007 | Rummel |
| 2007/0250793 | A1 | 10/2007 | Miura et al. |
| 2007/0268300 | A1 | 11/2007 | Janet |
| 2008/0059913 | A1 | 3/2008 | Burtner et al. |
| 2008/0215978 | A1 | 9/2008 | Bamba |
| 2008/0250021 | A1* | 10/2008 | Boys ................ G06F 17/30256 |
| 2009/0164387 | A1* | 6/2009 | Armstrong ........... G06F 17/241 |
| | | | 705/36 R |
| 2010/0011304 | A1 | 1/2010 | Van Os |
| 2010/0131881 | A1 | 5/2010 | Ganesh |
| 2010/0156889 | A1 | 6/2010 | Martinez |
| 2010/0253686 | A1 | 10/2010 | Alsbury |
| 2011/0047014 | A1 | 2/2011 | De Angelo |
| 2011/0219324 | A1 | 9/2011 | Watanabe |
| 2012/0079427 | A1 | 3/2012 | Carmichael |
| 2012/0110096 | A1 | 5/2012 | Smarr et al. |
| 2012/0110458 | A1* | 5/2012 | Brown .............. G06F 17/30575 |
| | | | 715/733 |
| 2012/0117476 | A1* | 5/2012 | Siegrist ................ G06F 19/327 |
| | | | 715/733 |
| 2012/0221954 | A1 | 8/2012 | Tanaka |
| 2012/0240064 | A1 | 9/2012 | Ramsay |
| 2013/0019173 | A1 | 1/2013 | Kotler et al. |
| 2013/0103701 | A1 | 4/2013 | Vishnubhatta |
| 2013/0223614 | A1 | 8/2013 | Tuchman |
| 2013/0239012 | A1 | 9/2013 | Barak |
| 2014/0325600 | A1* | 10/2014 | Odenheimer .......... H04L 63/10 |
| | | | 726/4 |

OTHER PUBLICATIONS

Non-final Office Action dated Dec. 21, 2015 for related U.S. Appl. No. 13/569,700.
Final Office Action dated Jun. 9, 2015 for U.S. Appl. No. 13/569,700.
Non-final Office Action dated Feb. 28, 2014 for U.S. Appl. No. 13/569,700.
Final Office Action dated Jun. 19, 2014 for U.S. Appl. No. 13/569,700.
"hierarchy, n." OED Online. Oxford University Press, Jun. 2014. Web. Jun. 13, 2014.
"Hierarchy." Webster's New World & Trade; Computer Dictionary. Hobokcn: Wiley, 2003. Credo Reference. Web. Jun. 13, 2014.
Non-final Office Action dated Dec. 17, 2014 for U.S. Appl. No. 13/569,700.
"Flipboard for iPhone review", Dec. 2011, 9 pages, url: http://www.appsafari.com/news/17786/flipboard-for-iphone/.
Paul Greenberg, "Oracle Open World 2010: It All Works Out in the . . . " Social CRM: The Conversation, Sep. 27, 2010, 6 pages.
Kathy Miedema, "Oracle Fusion Applications CRM Helps Drive Sales Sharp, Practical User Experience" Oralce, Usable Apps, Application User Experience, First Published: Dec. 30, 2011, Revised: Jun. 22, 2012, 3 pages.
Google finance, Jan. 6, 2013, 2 pages, url: http://www.google.com/finance?cid=419344.
"Mashups: The What and Why", Salesforce, Apr. 10, 2007, 4 pages, url: https://developer.salesforce.com/page/Mashups_The_What_and_Why.
Adam Ostrow, "13 Must-See Google Maps Mashups", Mashable, Jul. 10, 2007, 12 pages, url: http://mashable.com/2007/07/10/googlc-maps-mashups-2/.
Housingmaps, 2 pages, Feb. 15, 2013, 2 pages, url: http://www.housingmaps.com/.
Final Office Action dated Apr. 7, 2016 for related U.S. Appl. No. 13/569,700.
Non-final Office Action dated Oct. 25, 2016 for related U.S. Appl. No. 14/310,626.
Non-final Office Action dated Dec. 2, 2016 for related U.S. Appl. No. 14/310,591.
Final Office Action dated May 17, 2017 for related U.S. Appl. No. 14/310,626.
Final Office Action dated Jun. 16, 2017 for related U.S. Appl. No. 14/310,591.

* cited by examiner

Related Actions

Edit Coverage                Start Phone Conference
Edit Territory Details       Send Instant Message
Create Territory Proposal    Add To My Address Book
Manage Sales Quota           Add As A Connection

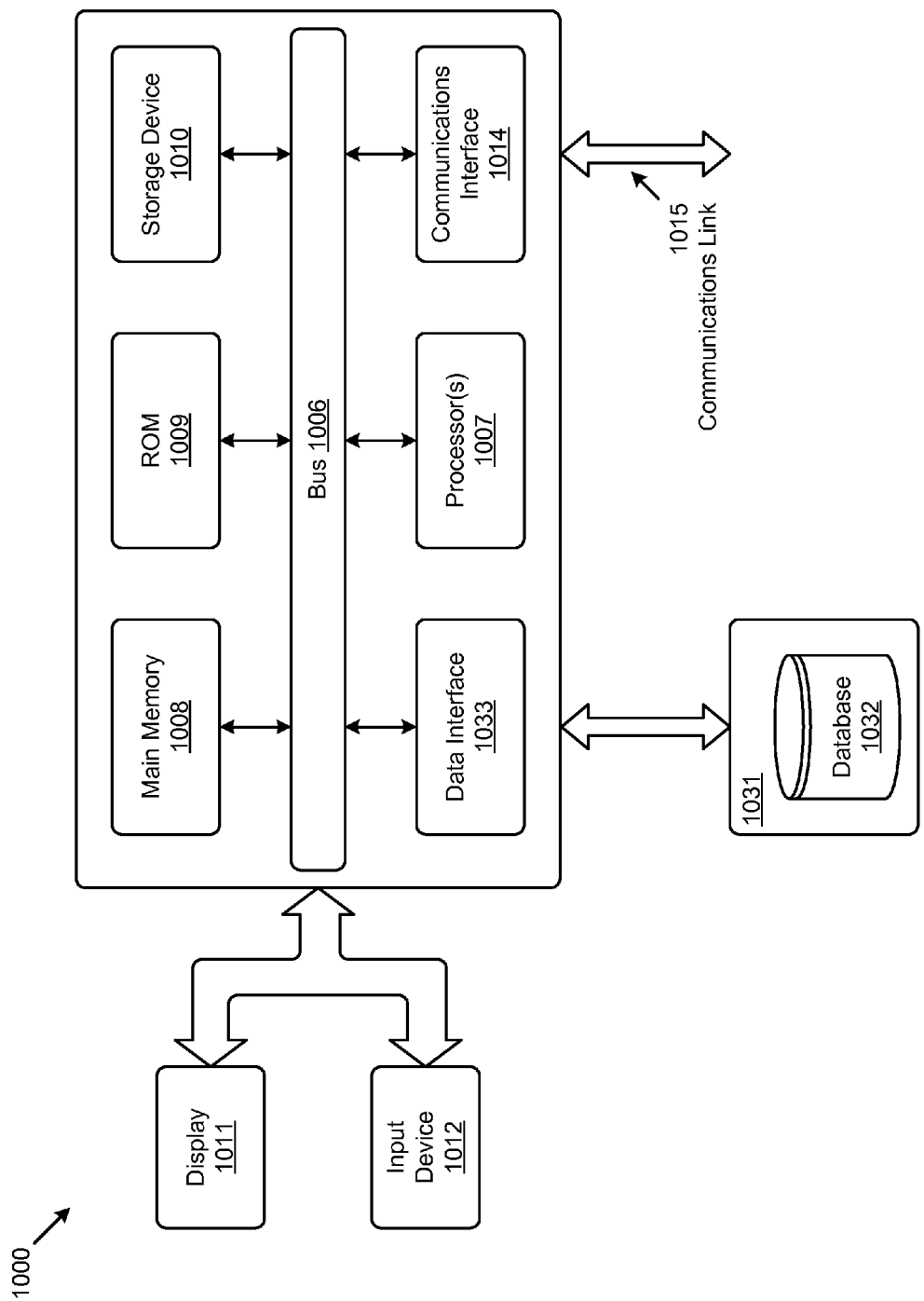

USER INTERFACE FOR RELATING ENTERPRISE INFORMATION WITH PUBLIC INFORMATION USING A PRIVATE USER PROFILE AND SCHEMA

RELATED APPLICATIONS

The present application claims the benefit of priority to U.S. Provisional Patent Application Ser. No. 61/838,054, entitled "METHOD AND SYSTEM FOR IMPLEMENTING AN INTELLIGENT ENTRY POINT FOR ENTERPRISE APPLICATIONS", filed Jun. 21, 2013; and the present application claims the benefit of priority to U.S. Provisional Patent Application Ser. No. 61/838,056 entitled "METHOD AND SYSTEM FOR IMPLEMENTING A SUNBURST INTERFACE", filed Jun. 21, 2013, both of which are hereby incorporated by reference in their entirety.

Further information is disclosed in a related U.S. patent application Ser. No. 14/310,591, entitled "CONFIGURING AND DISPLAYING MULTIDIMENSIONAL DATA USING TWO OR MORE CORRELATED INTERACTIVE SCREEN INTERFACES", filed on even date herewith, and in U.S. patent application Ser. No. 14/310,626, entitled "METHOD AND SYSTEM FOR RECONFIGURING A MULTIDIMENSIONAL INTERFACE USING DIMENSION TILES", filed on even date herewith, each of which are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of user interfaces for information aggregation services and more particularly to techniques for relating enterprise information with public information based on a schema and user profile.

BACKGROUND

Computer users have access to many sources of information, including social networks and news media. In addition to the social aspects, these information sources can often be used to provide valuable data that allows an individual or business/organization employee to drive business decisions.

Given the vast amount of data that are available and accessible from current data sources, aggregation tools are often needed to allow the user to adequately comprehend the information. There are many types of information aggregation solutions that have been used to help automate the data gathering/comprehension process. Examples of such tools include RSS readers, portals, and mash-up interfaces.

The problem with these existing aggregation tools is that, while useful to acquire data from public information sources, these tools do not have the capability to effectively or efficiently access and/or integrate information from enterprise application systems and/or data sources, which data may be a cross-section of a corpus of enterprise data.

For example, consider the typical RSS reader. RSS readers are a type of data aggregation tool which is used to pull news and social media from different sources together. The problem is that RSS readers cannot effectively relate topics to each other or to subscribers, because by their nature, RSS streams are independent.

Portals aggregate analytic and textual information by providing a single place where aggregated content is displayed in small regions called "portlets" side by side. However, known portals do not automatically relate information in different portlets to each other or the user.

Legacy implementations of mash-ups fail to relate and present information selected from sources involving both structured data and related unstructured data.

As is evident, conventional tools are unable to integrate with enterprise data, and are unable to effectively relate the different acquired data sets to each other or to a given user. Without being able to handle these functions, the tools cannot optimally help users to correlate against the acquired data. This creates barriers to the user being able to effectively obtain, identify, and relate important topics, and can therefore frustrate the ultimate goal of allowing the user to comprehend the state of their business and drive sound business decisions.

None of the aforementioned legacy approaches achieve the capabilities of the herein-disclosed techniques for relating enterprise information with public information based on a schema and user profile. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for relating enterprise information with public information based on a schema and user profile.

Embodiments commence upon accessing a private user profile from a private data area and determining a role and/or access privilege from the user profile. Portions of the user profile are used to retrieve enterprise data from an enterprise data repository. Aspects of retrieved enterprise data are then used to determine at least one public information source, from which is retrieved at least some publically-accessible information to be combined with information from the enterprise data repository and displayed to a user. Portions of the retrieved enterprise data are presented in a first display area and portions of the publically-accessible information are displayed in a second display area. Techniques are disclosed for forming relationships between the information from the enterprise data repository and the publically-accessible information. Structured data and unstructured data are combined in the display areas.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 7D is a graphic depiction of action prompts for taking action based on data resulting from relating unstructured information with structured information based on a schema and user profile, according to some embodiments.

FIG. 10 depicts a block diagram of an instance of a computer system suitable for implementing embodiments of the present disclosure.

DETAILED DESCRIPTION

Figure 1A:
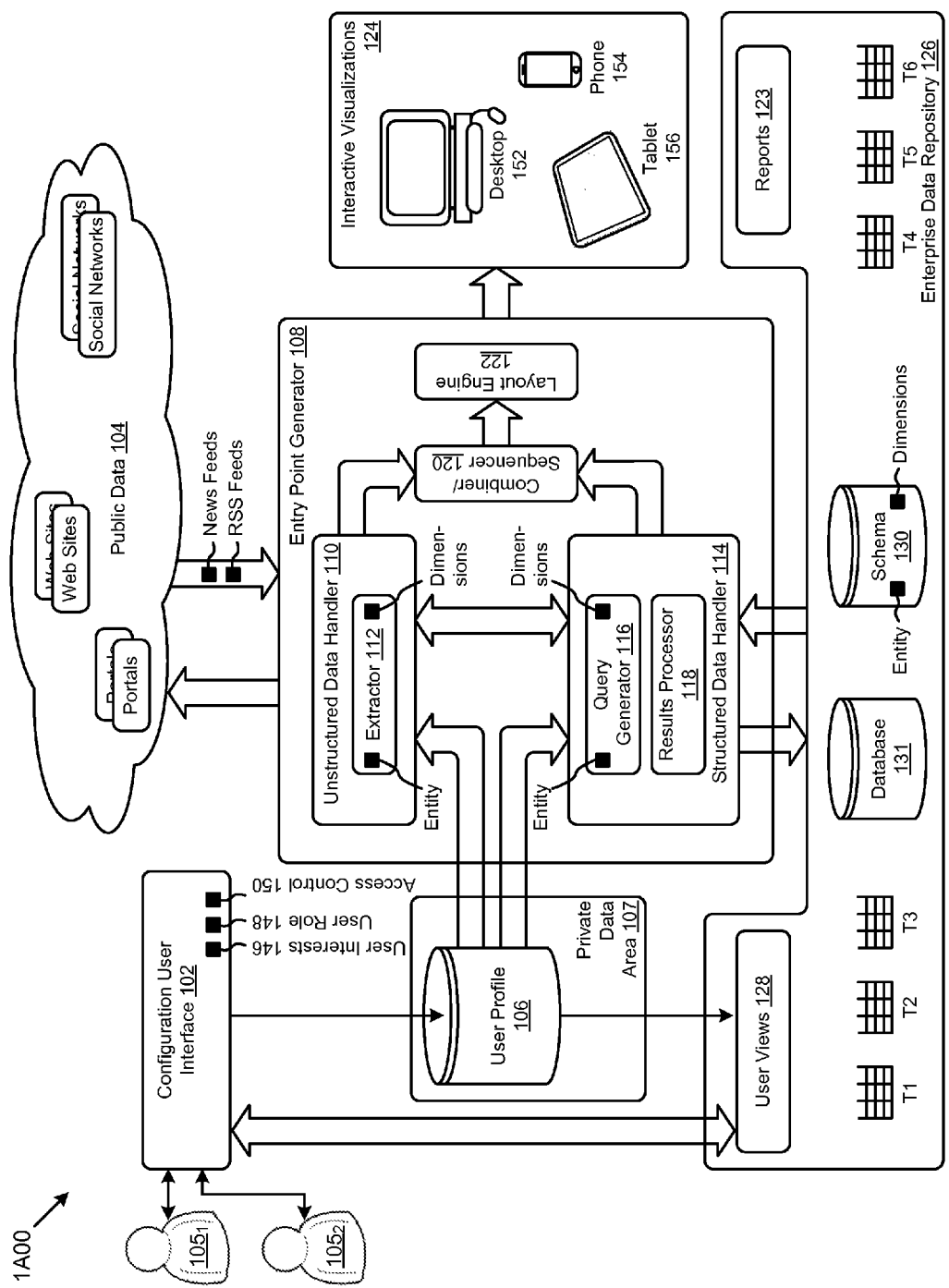
FIG. 1A depicts an environment for relating enterprise information with public information based on a schema and user profile, according to some embodiments.

Some embodiments of the methods, systems and environments disclosed herein and in the accompanying figures describe how to access private information, and then to use the private information to access related information retrieved from one or more enterprise application and further to access public information sources to acquire data that is relevant to a user.

Overview

Modern computer users have access to many sources of information, including social networks and news media. In addition to the social aspects, these information sources can often be used to provide valuable data that allows an individual or business/organization employee to drive business decisions.

Given the vast amount of data that are available and accessible from modern data sources, aggregation tools are often needed to allow the user to adequately comprehend the information. There are many types of information aggregation solutions that have been used to help automate the data gathering/comprehension process. Examples of such tools include RSS readers, portals, and mash-up interfaces.

The problem with these existing aggregation tools is that, while useful to acquire data from public information sources, these tools do not have the capability to effectively or efficiently access and/or integrate information from enterprise application systems and/or data sources, which data may be a cross-section of a corpus of enterprise data.

For example, consider the typical RSS reader. RSS readers are a type of data aggregation tool which is used to pull news and social media from different sources together. The problem is that RSS readers cannot effectively relate topics to each other or to subscribers because, by their nature, RSS streams are independent of each other.

Portals aggregate analytic and textual information by providing a single place where aggregated content is displayed in small regions called "portlets" side by side. However, known portals do not automatically relate information in different portlets to each other or the user.

Legacy implementations fail to take steps to use private information (e.g., information that is private to a particular user or other entity), and then to identify names and/or entities that are in turn used to relate present information selected from sources involving both public data and related private or enterprise data. Moreover, legacy implementations fail to take steps to identify names and/or entities and database schema, combinations of which are used to relate present information selected from sources involving both structured data and related unstructured data.

As is evident, conventional tools are unable to integrate with enterprise data, and are unable to effectively relate the different acquired data sets to each other or to a given user (e.g., based on information that is private to the given user). Without being able to handle these functions, the tools cannot optimally help users to correlate against the acquired data. This creates barriers to the user being able to effectively obtain, identify, and relate important topics, can therefore frustrate the ultimate goal of allowing the user to comprehend the state of their business and drive sound business decisions. Barriers and some techniques to overcome the barrier are compared in Table 1.

TABLE 1

Comparisons

| Desire | RSS | Portal | What's Needed |
| --- | --- | --- | --- |
| Ability to aggregate data from different sources | Yes | Yes | Aggregate unstructured data from sources including sources determined, at least in part by filtering or querying against user profile. |
| Ability to relate data items to each other based on a user's profile | No | No | Ability to relate data items to each other based on entities extracted from a user profile or from the aggregated information itself, for example, using pre-existing schema to relate the user's interest to the unstructured information. |
| Ability to relate data to a particular user | No | Sometimes | Ability to relate the aggregated data to a particular user using a profile. |

In other embodiments as disclosed herein, a system is configured to form relationships between at least these three data items:
  private data (e.g., data accessible only from within an enterprise data repository)
  publicly-accessible data such as new feeds and
  an assigned function of a user (e.g., title, roles or responsibilities).

In one embodiment disclosed herein, a system is configured to form relationships between at least these three data items:
  unstructured data,
  structured data such as enterprise data stored in an enterprise repository, and
  interests of a user.

The relationships between the aforementioned items can be based on:
  A user profile (e.g., defined using a data item such as geographies, product names, customer that the user has access to, etc.).
  Extracted entities from unstructured text (e.g., entities based on geographies, product names, customer, etc.).
  A structural description of enterprise-wide or other structured data (e.g., a data schema comprising geographies, product names, customer, etc.).
  A presentation of the aforementioned structured and unstructured data in a manner to facilitate user actions from any presented item.

The aforementioned embodiments, and other embodiments presented herein and/or as pertaining to the appended figures can form the basis for an approach to implement an intelligent entry point for enterprise applications. Some embodiments enable users to receive a presentation of information that relates to a user's interests, and which are gathered from combinations of unstructured data (e.g., news feeds, RSS reader feeds) and information and/or presentations retrieved from structure data (e.g., business intelligence dashboards, visual analytics, etc.). This approach can serve to tell users a story pertaining their interests (e.g., their business focus) by assembling information relevant to them from multiple sources, relating the assembled information pieces to one another, and meaningfully presenting the combinations of information (e.g., in an array and/or in a time-oriented sequence). In some situations, real-time market awareness can be provided by only showing what is new, trending, and changing. Some embodiments suggest a course of actions based on information in a view. Users can interact or otherwise engage with various presentations so as to facilitate a user investigation starting from a given launch point. The information is presented in a natural user interface and interactive visualizations are provided to facilitate further data analysis.

DEFINITIONS

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 for relating enterprise information with public information based on a schema and user profile. As an option, one or more instances of environment 1A00 or any aspect thereof may be implemented in the context of the architecture and functionality of the embodiments described herein. Also, the environment 1A00 or any aspect thereof may be implemented in any desired environment.

As shown in FIG. 1A, an unstructured data handler 110 serves to access unstructured data (e.g., public data 104 in the form of web sites, portals, social networks, news feeds, RSS feeds, other topical feeds etc.). A structured data handler 114 serves to access an enterprise data repository that is organized according to a data schema 130. The enterprise data can be organized as tables (e.g., table T1, table T2, table T3, table T4, table T5, table T6, etc.) and/or as files, and/or as data schema 130, and/or can be stored as other sort of data stored within or accessible to an enterprise data repository 126 (e.g., comprising database 131). The shown structured data handler 114 comprises a query generator 116 and a results processor 118. In exemplary embodiments, entities and dimensions can be derived through operations within the structured data handler 114 and/or from operations within the extractor 112 and/or derived from the unstructured data handler 110 and/or from the query generator 116, and/or from parsing of data schema 130.

Each of the aforementioned unstructured data handler 110 and structured data handler 114 can access a user profile 106 (e.g., from a private data area 107), and can use aspects determined from the user profile when accessing data. For example, retrieval techniques (e.g., using URLs and/or using queries) for accessing data (e.g., unstructured data or structured data) can include a user's interests 146, a user's role or roles 148, and/or a user's access control 150. A perusing user $105_1$ or configuring user $105_2$ can individually or collaboratively configure a user profile. The shown configuration user interface 102 serves to provide access to the user profile, and the shown configuration user interface can be accessed at any time. Configuration items found in a user profile can be used to control aspects of information retrieval (e.g., what interests or roles, etc. are influential) and/or any configuration items found in a user profile can be used to control aspects of visualizations (e.g., interactive visualizations 124) and/or aspects of reports (e.g., reports 123). Moreover, private data area 107 can be an area within or based on information retrieved from enterprise data repository. Access techniques to access to data stored within or accessible through the private data area 107 may require private data access credentials (e.g., passwords), and/or may require special knowledge (e.g., knowledge of a particular URL) and/or may be accessed only by users or processes that possess a security clearance at or above a certain access level. The security clearance needed to access user profile 106 from a private data area may include combinations of private data access credentials, special knowledge.

Outputs from the unstructured data handler and outputs from the structured data handler can be combined (see combiner/sequencer 120) and formatted (e.g., using a layout engine 122) into interactive visualizations that can be displayed on a desktop 152, a smart phone 154 and/or a tablet 156, and or can be stored as a report 123.

Some embodiments include a partitioning where an unstructured data handler 110, a structured data handler 114, and combiner/sequencer 120 and a layout engine 122 are combined into the shown entry point generator 108. The architecture of an entry point generator provides a communication environment so as to facilitate cooperative interaction between any constituent components. For example, an entity extractor (e.g., extractor 112) might extract and store an entity, and that entity might be accessible by any components within environment 1A00. Or, dimensions within a data schema 130 and/or characteristics of any user views 128 might be initially accessed by a structured data handler 114, and the retrieved dimensions can be made accessible by any components within environment 1A00.

The systems within environment 1A00 work in combination to provide efficient was to identify, obtain, and relate important topics from many disparate sources of information. Example sources of business information include enterprise applications, social networks, news media, and business intelligence analytics (BI). The solution mashes up structured, unstructured, and semi-structured information from such sources and relates them together into a user interface. One such user interface is presented in the following FIG. 1B.

Figure 1B:
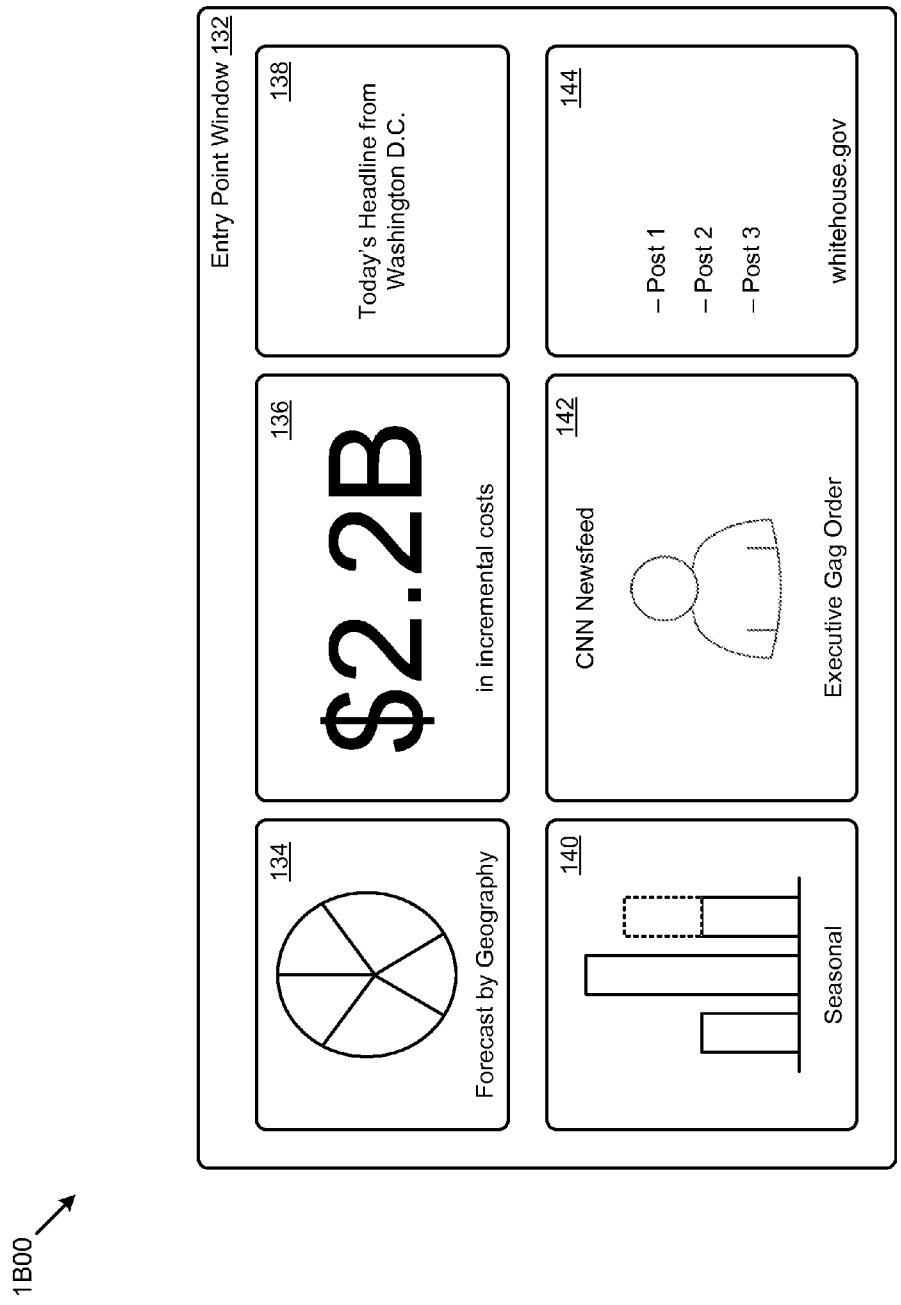
FIG. 1B exemplifies a window-oriented interface used for relating enterprise information with public information based on a schema and user profile, according to some embodiments.

FIG. 1B exemplifies a window-oriented interface 1B00 used for relating enterprise information with public information based on a schema and user profile. As an option, one or more instances of window-oriented interface 1B00 or any aspect thereof may be implemented in the context of the architecture and functionality of the embodiments described herein. Also, the window-oriented interface 1B00 or any aspect thereof may be implemented in any desired environment.

FIG. 1B illustrates an example window-oriented interface 1B00 in the form of an entry point window 132. To populate this entry point window, information can be pulled from multiple types of data sources, including enterprise application sources. For example, some portions of the shown window-oriented interface 1B00 illustrates the display of information from business intelligence sources. In this example, the information from business intelligence sources comprise the shown forecast by geography 134 and a bar chart 140. The entry point window 132 may also include portions that are configured to display information from non-enterprise data sources (e.g., public information sources). Examples of non-enterprise data sources might include a source's news feeds and social network sources. In this example, a news feed includes headlines, headline stories, and any variety of blogs or posts (e.g., headline 138 and newsfeed headline 142, post 144).

Only information identified as being relevant to the user is pulled for display in an interface. Information about the user (e.g., from a user profile 106) can be used to identify topics of relevance to the user. For example, the user's role within a company and/or past history of data access behaviors, are types of information that can potentially be used to identify topics of interest to the user.

The different items of information are displayed in a manner so as to relate to one another. Relationships formed between different items of information facilitate presenting meaningful combinations of information, and meaningful sequencing of the displayed data. For example, data from an enterprise application/business intelligence system about a given product (e.g., performance indicator 136), customer, and/or lead can be displayed in combination with news articles about that customer or product. This facilitates comprehension and usefulness of the information to the user. Real-time market awareness can be provided by only showing what is new and changing and/or unusual or abnormal. Aspects of this disclosure can be used to engage users with what is new and changing and/or unusual or abnormal, and further user-directed investigation is facilitated via the user interface. For example, the performance indicator 136 (booked revenue) is included in the summary presentation of entry point window 132 because performance dropped more than N % below sales quota, which is deemed to be abnormal. Other examples of new and changing and/or unusual or abnormal might be a customer's or competitor's earning "surprises" from the stock market. When there are no "surprises", presentation of earnings data might be suppressed (e.g., not shown in the entry point window 132).

Different portions of the interface can be displayed in various ways to highlight the importance (to the user) of different items of information. For example, the central portions of the interface 1B00 of FIG. 1B has content that is displayed larger than the other portions of the interface, indicating a relatively higher importance to these items of content. The central location of these items may also be used to indicate the item's importance. Information about the user (e.g., user's role, job title, past usage history, etc.) can be used to identify which of the information items should be displayed with greater prominence.

Figure 1C:
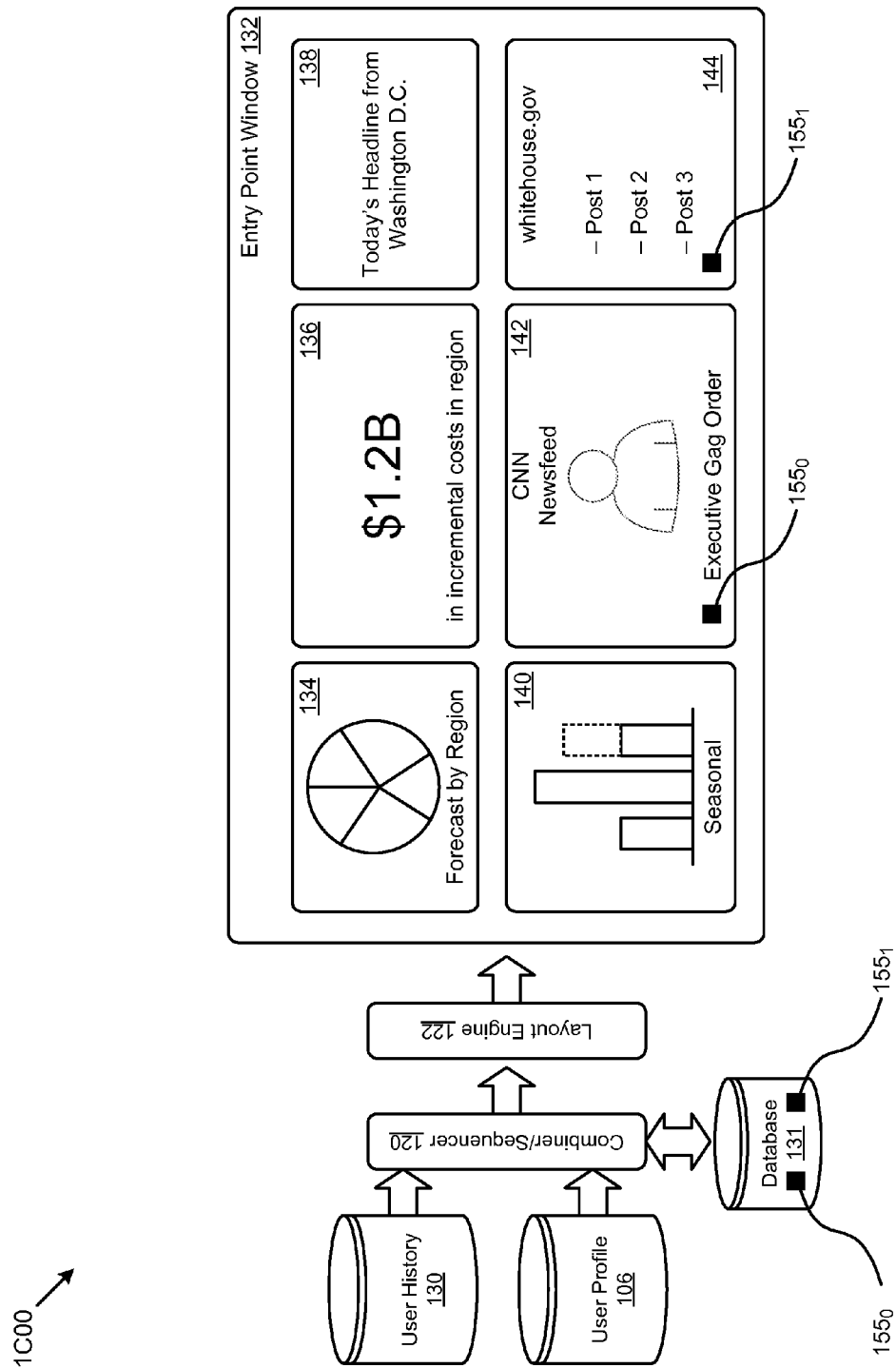
FIG. 1C depicts data-to-data relationships as presented in a window-oriented user interface as used for relating enterprise information with public information based on a schema and user profile, according to some embodiments.

FIG. 1C depicts data-to-data relationships 1C00 as presented in a window-oriented user interface as used to relate unstructured information with structured information based on a schema and user profile. As an option, one or more instances of user-to-data relationships 1C00 or any aspect thereof may be implemented in the context of the architecture and functionality of the embodiments described herein. Also, the user-to-data relationships 1C00 or any aspect thereof may be implemented in any desired environment.

As shown in FIG. 1C, data-to-data relationships are formed by relating two or more data items (e.g., data item $155_0$, data item $155_1$) based on an aspect shared between the two or more data items. Information corresponding to the related data items are presented a window-oriented user interface 132. For example, and as shown, the unstructured text of the article "Executive Gag Order" from CNN Newsfeed 142 might contain the term "overreach" and also, one or more posts from whitehouse.gov 144 might also contain the term "overreach". The article (e.g., from data item $155_0$) and posts (e.g., from data item $155_1$) are related via a data-to-data relationship and are presented in entry point window 132.

Figure 1D:
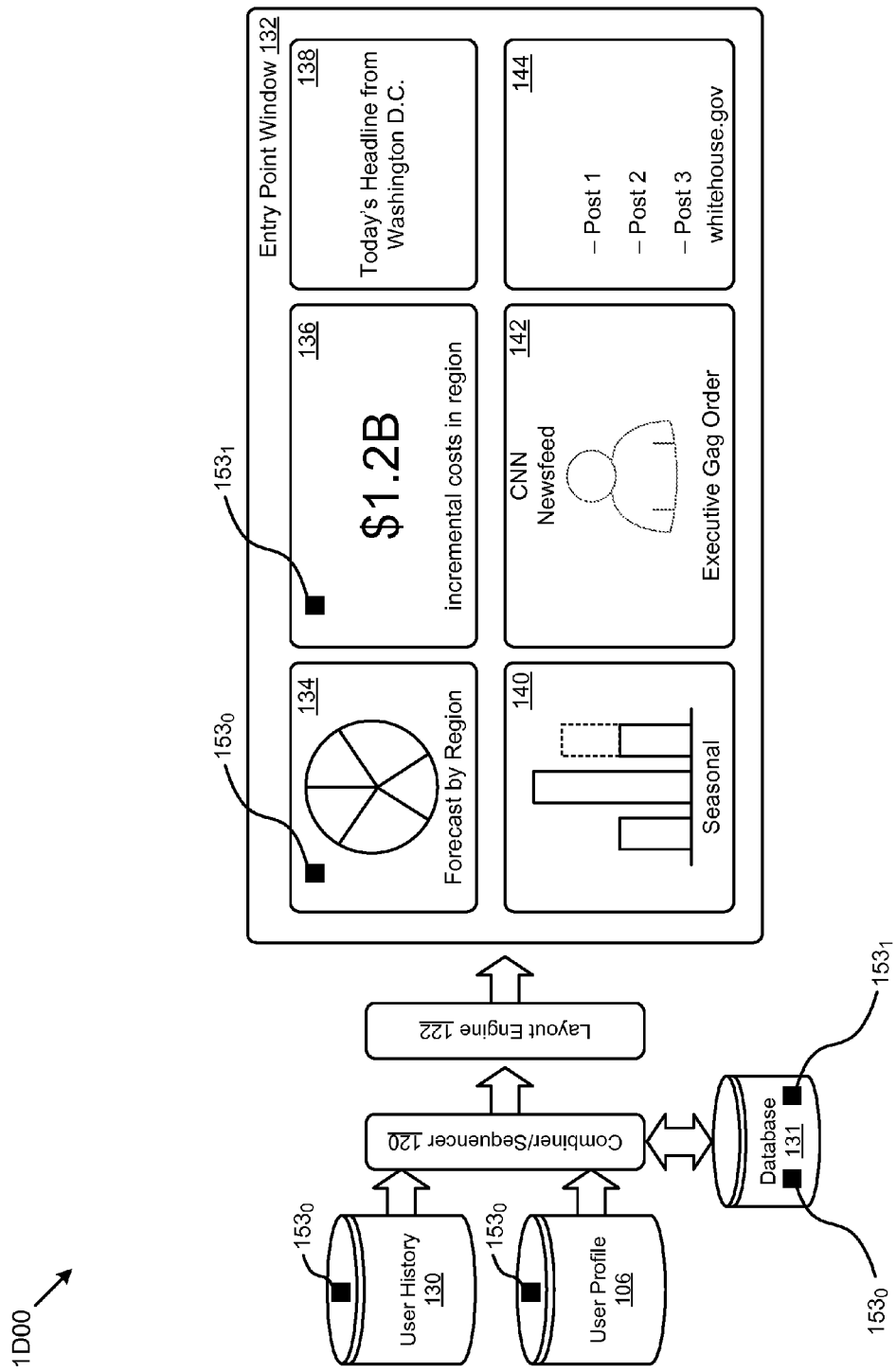
FIG. 1D depicts user-to-data relationships as presented in a window-oriented user interface as used for relating enterprise information with public information based on a schema and user profile, according to some embodiments.

FIG. 1D depicts user-to-data relationships 1D00 as presented in a window-oriented user interface as used for relating enterprise information with public information based on a schema and user profile. As an option, one or more instances of data-to-data relationships 1D00 or any aspect thereof may be implemented in the context of the architecture and functionality of the embodiments described herein. Also, the data-to-data relationships 1D00 or any aspect thereof may be implemented in any desired environment.

As shown in FIG. 1D, user-to-data relationships are formed by relating two or more data items (e.g., data item $153_0$, data item $153_1$) based on an aspect shared between the two or more data items. Information corresponding to the related data items are presented a window-oriented user interface 132. For example, and as shown, the structured information "Forecast by Region" might contain or be related to the term "Europe" and also, one or more terms in structured data "incremental costs in region" might also contain or be related to the term "Europe".

Figure 2:
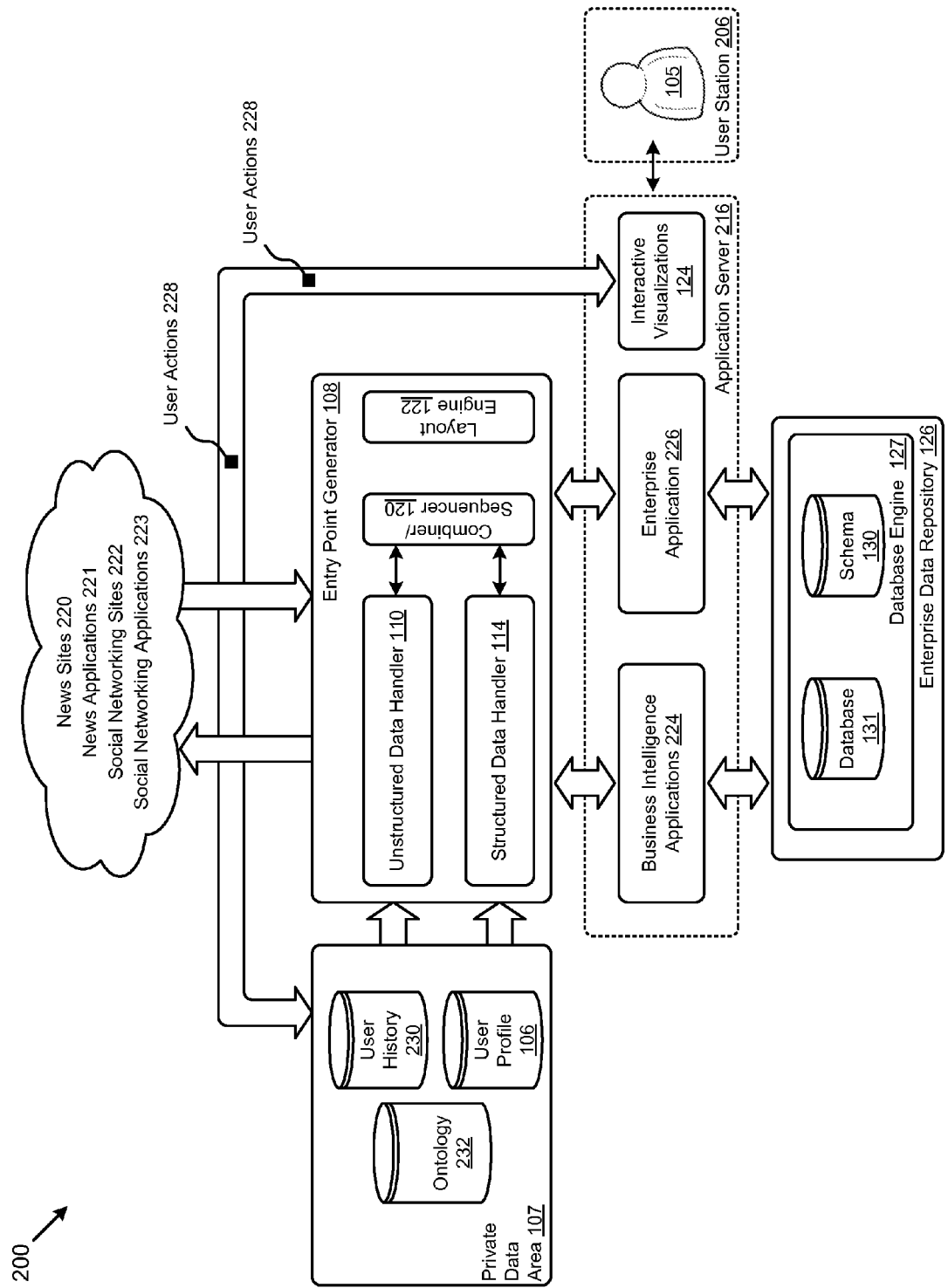
FIG. 2 exemplifies a data flow as used in systems to relate unstructured information with structured information based on a schema and user profile, according to some embodiments.

FIG. 2 exemplifies a data flow 200 as used in systems for relating enterprise information with public information based on a schema and user profile. As an option, one or more instances of data flow 200 or any aspect thereof may be implemented in the context of the architecture and functionality of the embodiments described herein. Also, the data flow 200 or any aspect thereof may be implemented in any desired environment.

The data flow 200 depicts users 105 at user stations 206 that access an application server 216. Applications (e.g., an enterprise application 226 and/or a business intelligence applications 224) use the entry point generator 108 to generate an entry point window, which the intelligent entry point is configured for access by a user station such that a user can interact with the intelligent entry point, possibly by acting upon suggested different courses of actions, which actions are in turn based on information in view within the entry point window. The user station 206 comprises any type of computing station that may be used to operate or interface with the applications. Examples of such user stations 206 include for example, workstations, personal computers, or remote computing terminals. The user station 206 comprises a display device, such as a display monitor, for displaying a user interface to users at the user station 206. The user station also comprises one or more input devices for the user to provide operational control over the activities of the system, such as a mouse or keyboard or touch screen configured to serve as a pointing object within a graphical user interface (e.g., to receive and/or capture and/or forward user inputs).

The system of FIG. 2 includes an entry point generator 108 that provides an interface for displaying information to a user at user station 206. The entry point generator 108 allows users to put together and analyze information of different types and from different data sources. Examples of such data sources include news sites 220, news applications 221, RSS readers, social networking sites 222, social networking applications 223, business intelligence applications 224, enterprise applications 226, and any data from enterprise database systems and/or from an enterprise data repository 126.

Some embodiments of the window-oriented interface of FIG. 1B emphasize (e.g., by size or position or animation or any other technique) data items that may be of particular interest and summaries are provided by applications typically used by enterprises. Strictly as examples, many businesses and organizations employ one or more enterprise applications, and in some cases, suites of business applications that are configured to provide visibility and control over various aspects of the business or enterprise. Such business or enterprise applications can include, without limitation, customer relations management (CRM) applications, enterprise resource planning (ERP) applications, supply chain management applications, business intelligence/ dashboarding applications, and other applications dealing with various finance, accounting, manufacturing, and/or distribution functions, to name but a few examples. Exemplary enterprise application suites include, without limitation, Oracle Fusion, Oracle eBusiness Suite, and JD Edwards Enterprise One, all of which are available from Oracle Corporation of Redwood Shores, Calif.

As previously noted, it would be useful to provide an effective mechanism to gather and display enterprise-related information in combination with other sources of information. For example, consider the CRM application, which is designed to facilitate the ability of a business to create, develop, and build relationships with its customers or potential customers—with the intent to obtain or increases sales to customers. It would be very desirable to allow the users access the CRM data in combination with real-time news about the customers, allowing the user to stay informed and to be able to immediately and informatively act upon business activities and customers/leads.

In system 200, the entry point generator 108 accesses a user profile 106 and a user history 230 to identify topics that are known to be of particular interest to the user (e.g., by accessing a user profile) and/or to identify topics that are trending to be of particular interest to the user (e.g., by accessing an instance of user history 230). As shown, the user history 230 can be populated with user actions 228 that are responsive to any aspects depicted in window-oriented interface 1B00.

Exemplary user profiles can include any item of information that may be useful to determine existence of topics of interest. Further, user profiles can include any item of information that may be useful to determine a magnitude of interest in any particular topic. In some cases, topical interest can be imputed from profile information. For example, a profile might include the user's role within a company, a user's clearances and/or security levels, his/her job title, interests, etc. A user history might include a history of topics reviewed in the past and/or a trace of business objects created or acted upon by the user or by a user that shares similar characteristics (e.g., as determined by similarities between user profiles). Business objects such as business objects pertaining to certain customers/leads, can be used to identify customers/companies of interest. Existing customer lists and prospects or leads can be represented in enterprise applications as business objects. The user profile can comprise information that can be used to rank the importance of the retrieved data from data sources, allowing more important data items to be displayed more prominently in the user interface.

A structured data handler 114 gathers the data from an enterprise data repository using relational database queries, which in turn are formed based at least in part on a data schema 130, and in a manner that permits efficient querying of the gathered information. In some embodiments, the enterprise data repository 126 comprises a data mart or data warehouse system, and an ontology 232 can be provided to relate aspects found within the schema to aspects found in or inferred from the user profile 106 or user history 230. For example, an ontology 232 can be used by combiner sequencer 120 either singly or in combination with roles found in or inferred from the user profile 106.

Strictly as examples, Table 2 depicts user characteristics. A role or series of roles can be codified and presented in a user profile, and a data structure can associate any number of privileges to roles, as exemplified in FIG. 3.

TABLE 2

Sample User Characteristics

| Role or Title | Department Name | List of Characteristics or Interests |
|---|---|---|
| Sales Administrator | Sales | Events, Schedules |
| Sales Manager | Sales | Quotas, Bookings |
| Sales Representative | Sales | Quotas, Bookings, Territories |
| Sales VP | Sales | Quotas, Revenue Recognition, EPS |

Further, a role can be associated with access privileges.

TABLE 3

Sample Access Privileges and Associations to Roles

| Role or Title | Assigned Access Privileges |
|---|---|
| Sales Representative | Access Mobile CRM<br>Access Sales Catalog<br>Add Document to Cart<br>Retrieve Incentive Compensation Plan Documents<br>Retrieve Own Incentive Compensation Plan Amounts |
| Sales VP | Access Mobile CRM<br>Access Sales Catalog<br>Add Document to Cart<br>Create or Edit Incentive Compensation Plan Documents<br>Retrieve Anyone's Incentive Compensation Plan Amounts |

Figure 3:
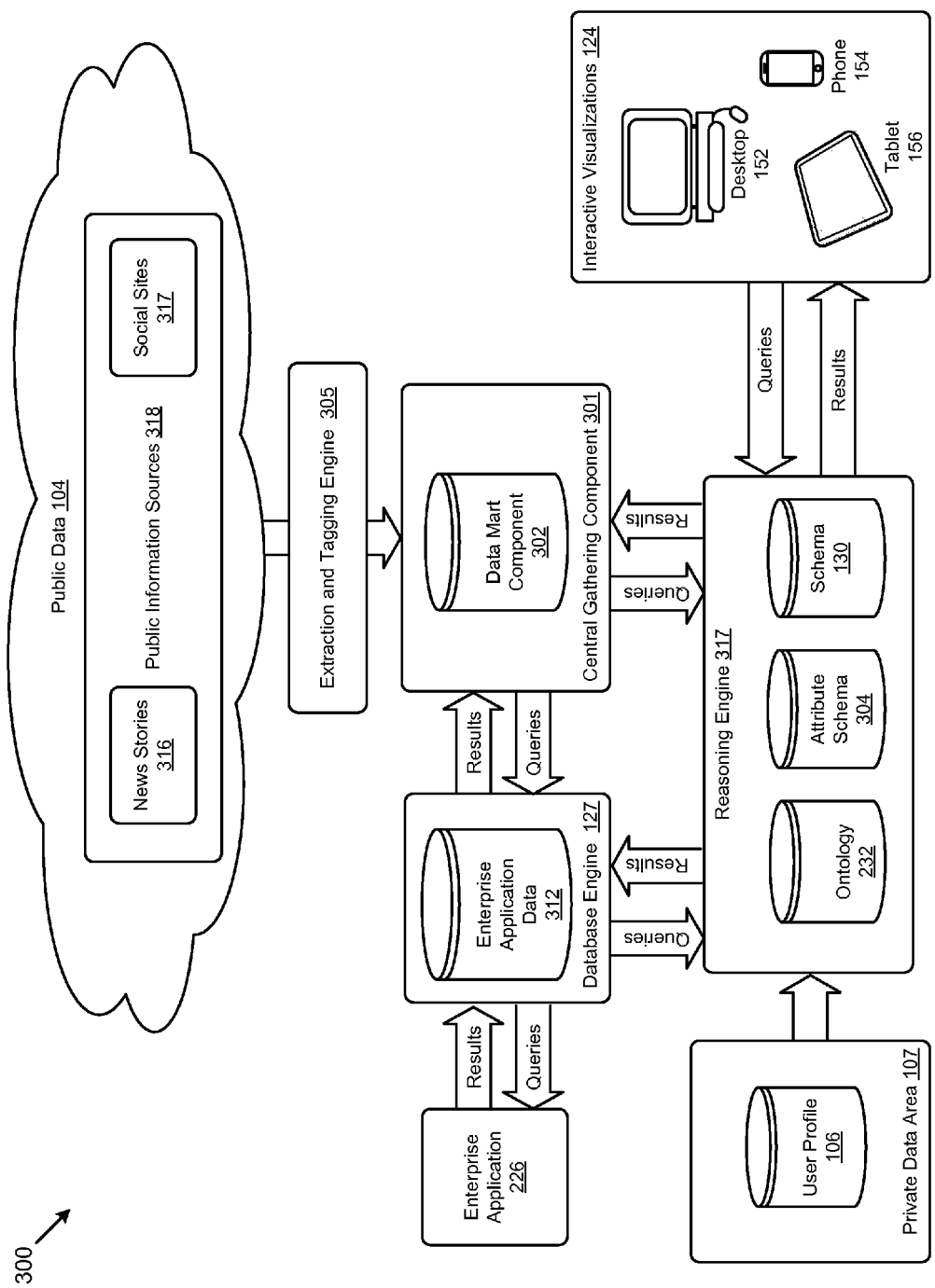
FIG. 3 exemplifies an enterprise-centric data flow as used in systems to relate unstructured information with structured information based on a schema and user profile, according to some embodiments.

Still further aspects of a user, a user's roles, privileges, clearances, etc. can be defined and stored within or in association with a user profile, and sorts of characteristics found within or in association with a user profile can be used to relate unstructured information with structured information FIG. 3 exemplifies an enterprise-centric data flow 300 as used in systems to relate unstructured information with structured information based on a schema and user profile. As an option, one or more instances of enterprise-centric data flow 300 or any aspect thereof may be implemented in the context of the architecture and functionality of the embodiments described herein. Also, the enterprise-centric data flow 300 or any aspect thereof may be implemented in any desired environment.

As shown, a central data gathering component 301 is employed to gather and hold (e.g., in data mart component 302) any of the data gathered from the various data sources, possibly including enterprise data (e.g., retrieved from application data 312) as well as public data retrieved from public information sources 318 (e.g., news stories 316, social sites 317, etc.). The system can process information gathered from any data source (e.g., from any sources that provide business information). The sources of business information could be internal to an enterprise, or specific to the user or client, or may be accessible to the public. Examples of typical sources of business information include news sources (e.g., via RSS readers), social networks such as the Oracle Social Network (OSN), news media, enterprise applications such as Oracle Fusion applications (e.g., enterprise application 226), and business intelligence/analytics. The sources may provide either structured, semi-structured, and/or unstructured data.

The dimensions of the business data model are extracted from enterprise schema (e.g., data schema 130). In the present embodiment, the dimensions are extracted from an extraction and tagging engine 305. Strictly as one example, attribute schema might be stored in a database or in a table or in a file (e.g., an XML file), and a list of keywords can be generated from that attribute schema. An attribute schema serves to relate one term to another term. For example, an attribute schema can organize terms into a hierarchy, and a pair of terms can be related based on their occurrence in the same hierarchy, or at the same level of a hierarchy, etc.

Incoming text can be tagged with the generated keywords, and such tagging can serve for purposes of faster searching operations and/or comparison operations. When a data mart is queried, the incoming text might correspond to any of the pre-generated entity tags or keywords. Additional linguistic technologies such as named entity recognition can be applied to enrich the keyword list and occurrence and resolution of tagged text. The dimensions of the business data model that are extracted from enterprise schema dimensions can be stored as metadata, and metadata can be exported or otherwise provided to be stored, possibly as attribute schema 304 (e.g., possibly maintained in an XML or XLS format). The attribute schema can then be transferred to the data mart component to set up dimensions and/or keywords corresponding to the gathered data. Further processing can be employed to provide data from the various sources to the data collection component corresponding to the appropriate data dimensions (e.g., from the business intelligence source, enterprise application source, news source, and/or social network sources). This permits the data from the different sources/structured/unstructured formats to relate to one another along various dimensions, e.g., so that a news article and an enterprise business object can both be queried and possibly related together by time dimension, customer dimension, etc.

In some cases a named entity recognition process can be used to extract entities from data sources (e.g., unstructured data sources such as news and social media text sources). The entity extraction process can annotate (e.g., tag) text from the source in order to extract the desired content and present in a tagged or semi-structured format to downstream processes.

For example, to create entities in the form of tuples such as:

"company: BigCo, Inc." or
"year: 2013" or
"country: US.", the entity recognition process can annotate/tag the text. The processed text can then be combined, fused, overlaid, or otherwise integrated with business intelligence information by matching up dimensions and text tags.

The solution combines the various data sources and identifies the information of relevance to the user. As earlier indicated, the system can use the user's enterprise job role and/or social network information to provide a relevance score to a bit of information. In one situation, the user's enterprise job role may contain a set of settings and/or dimensions that define his/her security access. For example, a user with a job role of "Regional Sales Manager" may have a security access grant to only those relations limited to "customer: BigCo, Inc." "country: US" and "year: 2014". Such security access grants to dimensions give a user limited secure access to business intelligence information. Those dimensions are also used to match up a user's security profile with text tags via named entity recognition.

Based on the information displayed to the user, the user can take certain actions against the enterprise data. The system can be configured to suggest different courses of actions based on the information presented in the interactive visualizations.

Figure 4A:
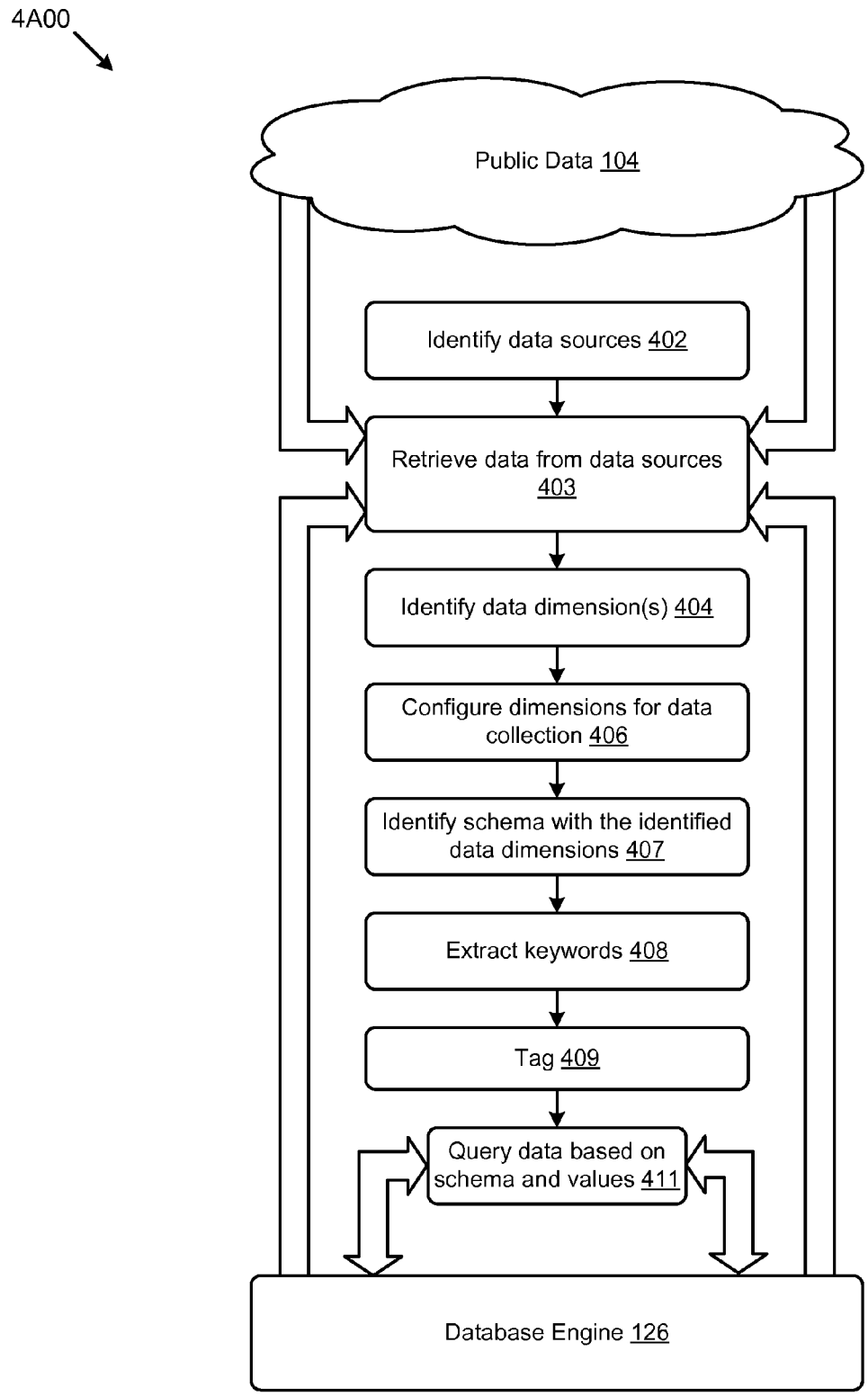
FIG. 4A presents a flowchart of a process for gathering data from various data sources as used in systems to relate unstructured information with structured information based on a schema and user profile, according to some embodiments.

FIG. 4A presents a flowchart of a process 4A00 for gathering data from various data sources as used in systems for relating enterprise information with public information based on a schema and user profile. As an option, one or more instances of process 4A00 or any aspect thereof may be implemented in the context of the architecture and functionality of the embodiments described herein. Also, the process 4A00 or any aspect thereof may be implemented in any desired environment.

As shown, one or more possible data sources are identified (see step 402). The system can retrieve data or information from any data source such as sources that provide public data (see step 403), as well as sources that provide business information.

After identifying data sources and after retrieving data from the identified data sources, data dimensions are identified (see step 404). The dimensions of the business data model are extracted from any suitable source, and the dimensions are used to configure the dimension for the data collection component (see step 406). An entity extraction process (e.g., the aforementioned named entity recognition process) might use a schema with identified dimensions (see step 407). Using the schema (e.g., the identified dimensions), extract keywords (see step 408). Some embodiments, as shown, include a step for tagging incoming data (see step 409). The schema can be used in combination with other metadata (e.g., see ontology 232) to query or otherwise retrieve data based on schema attributes and attribute values (see step 411) and then to extract desired entities from such data sources. Extraction can include processes to annotate text occurrences in the source, which annotations facilitate downstream processes to extract entities and/or dimensions from the content. For example, an extraction process might identify a city name and be able to tag it as a value of attribute "geography" or "city".

Figure 4B:
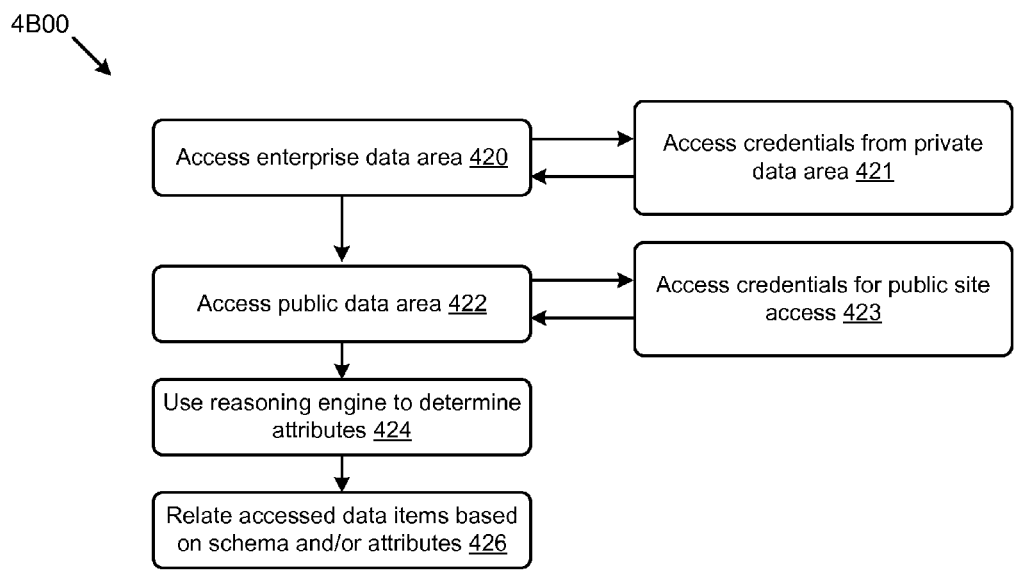
FIG. 4B presents a flowchart of an enterprise-centric process for accessing private data sources as used in systems to relate unstructured information with structured information based on a schema and user profile, according to some embodiments.

FIG. 4B presents a flowchart of an enterprise-centric process 4B00 for accessing private data sources as used in systems to relate unstructured information with structured information based on a schema and user profile. As an option, one or more instances of enterprise-centric process 4b00 or any aspect thereof may be implemented in the context of the architecture and functionality of the embodiments described herein. Also, the enterprise-centric process 4B00 or any aspect thereof may be implemented in any desired environment.

As shown the process commences upon accessing enterprise data area (see step 420), which in turn makes calls or queries to access credentials from a private data area (see step 421). The process continues upon accessing a public data area (see step 422), which in turn makes calls or queries to access credentials (e.g., a site login or subscription credential, etc.) for accessing the public data area (see step 423). A reasoning engine is used to determine attributes (e.g., interests, geographies, etc.), and any related (e.g., intersecting or common) attributes or schema terms are used to relate public information with enterprise information (see step 426). In some cases, enterprise information can include or be derived from business intelligence objects. Some such cases are discussed as follows.

Figure 4C:
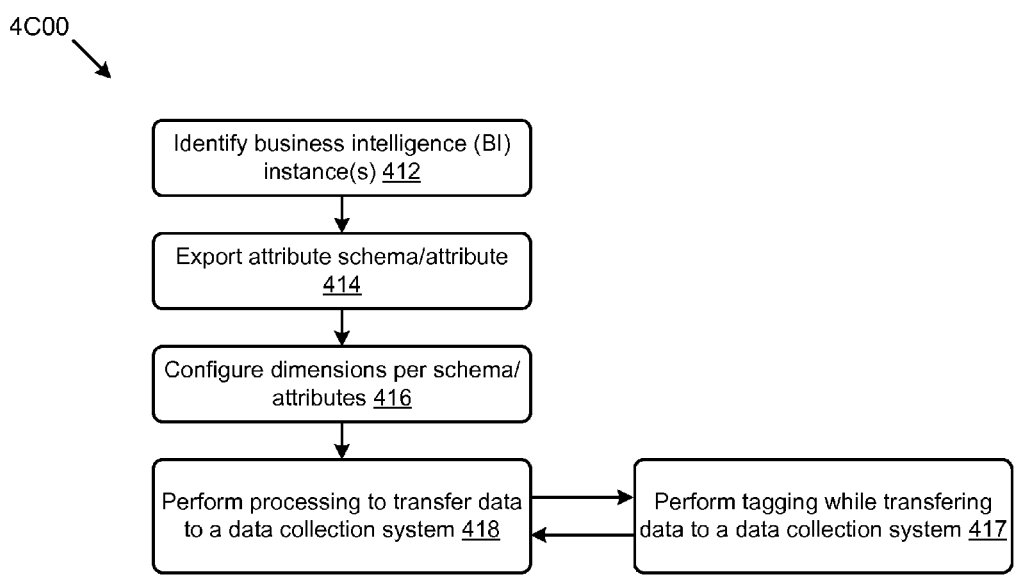
FIG. 4C presents a flowchart of an enterprise-centric process for gathering data from various data sources as used in systems to relate unstructured information with structured information based on a schema and user profile, according to some embodiments.

FIG. 4C presents a flowchart of an enterprise-centric process 4C00 for gathering data from various data sources as used in systems for relating enterprise information with public information based on a schema and user profile. As an option, one or more instances of enterprise-centric process 4C00 or any aspect thereof may be implemented in the context of the architecture and functionality of the embodiments described herein. Also, the enterprise-centric process 4C00 or any aspect thereof may be implemented in any desired environment.

As shown in FIG. 4C, the flowchart commences by identifying one or more business intelligence (BI) source instances (see step 412). The data source in this situation can comprise a BI report that is built using one or more enterprise application tables (e.g., table T1, . . . table T6, etc.). Any identified BI schema is exported from the BI system (see step 414). In one instance, the attribute schema can be derived from the BI metadata that was exported from the BI system, and this attribute schema is then imported into the data mart product. The dimensions of the data mart product are configured according to the attributed schema (see step 416).

Processing is then performed to transfer data from the various data sources into the data mart component. For data from the various data sources (e.g., unstructured data), further processing is performed transfer data from non-enterprise sources (such as public social media and news sources) into the data mart (see step 418).

Tagging may be employed in parallel (see step 417) while performing the actions of importing data into the data mart.

Figure 5:
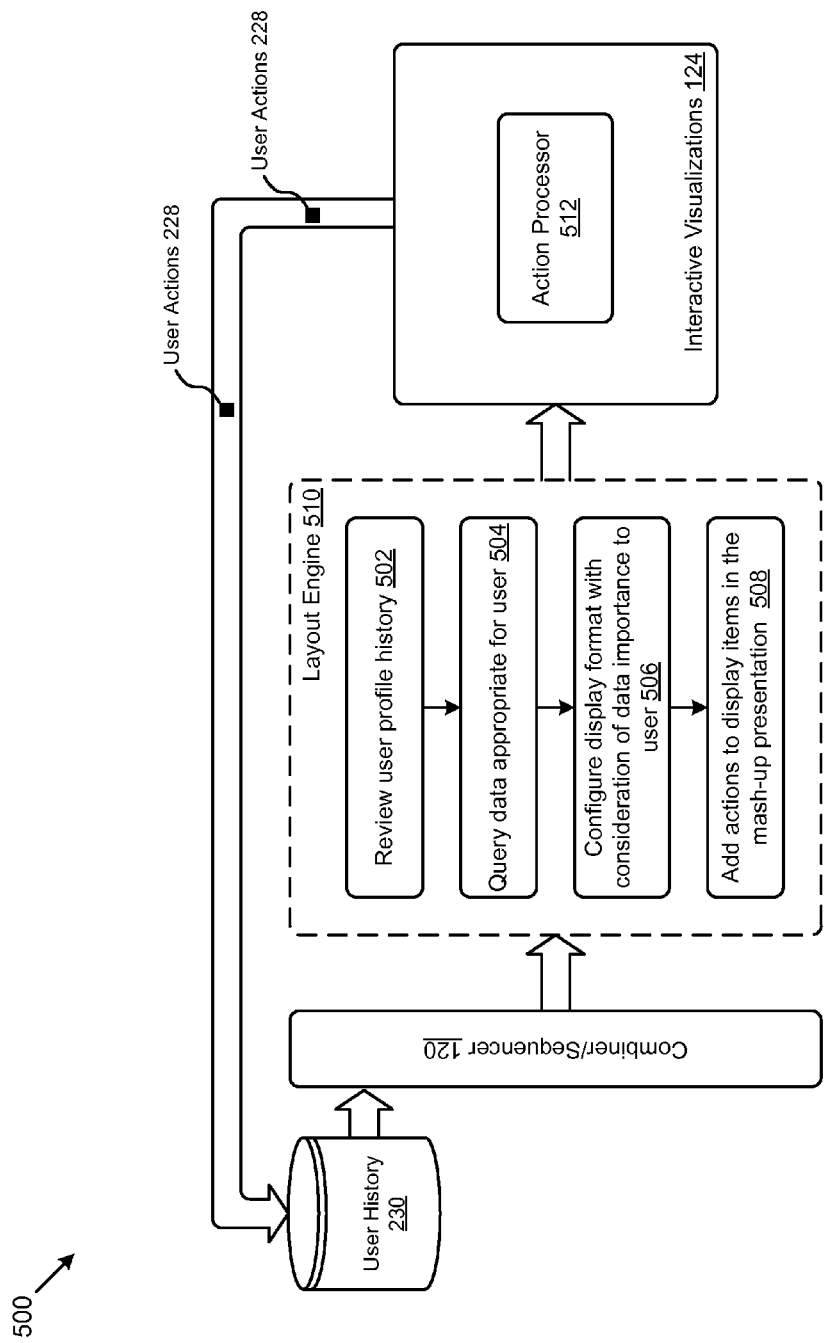
FIG. 5 exemplifies a presentation generation data flow as used in systems for relating enterprise information with public information based on a schema and user profile, according to some embodiments.

FIG. 5 exemplifies a presentation generation data flow 500 as used in systems to relate unstructured information with structured information based on a schema and user profile. As an option, one or more instances of presentation generation data flow 500 or any aspect thereof may be implemented in the context of the architecture and functionality of the embodiments described herein. Also, the presentation generation data flow 500 or any aspect thereof may be implemented in any desired environment.

The embodiment of FIG. 5 processes data to combine, sequence and visualize the multi-source information on a mash-up interface to the user. The combiner/sequencer might retrieve user profile information and use it to combine and/or sequence the data presentation. Similarly, a user profile and/or user history information is retrieved by a layout engine 510. The data retrieved from user profile information and/or retrieved from user history 230 is used by a layout engine to select relevant information, and to present the most relevant information in a prominent position within any of the interactive visualizations 124. For example, the user's enterprise job role can be used to identify information most likely to be of interest to the user and such information can be retrieved. The display format is configured with consideration of data importance to the user (see step 506). Information of particular importance or relevance to the user can be displayed with greater prominence on the interface (e.g., by presenting the information with larger size or more prominent placement in the central portion of the interface). Further particular actions (see FIG. 7D) can be configured with respect to a particular user, and/or with respect to the importance or other characteristics of the retrieved data. In such a scenario, a user can interact with interactive visualizations and an action processor 512 can facilitate user actions taken, based at least in part upon the information displayed to the user. For example the user can take certain actions against the presented enterprise data and/or the user can take certain actions against the presented public data. To facilitate user interaction, and to associate specific information with specific actions, users can be presented with a list of suggested transactions from both enterprise applications and collaboration tools. To create the list, the dimensions and entity tags are matched with the applications' business objects (BO) or collaboration tools' people. Techniques for forming a list of suggested transactions and for capturing user actions are given in following figures.

In one embodiment, the layout engine autonomously retrieves a user profile and reviews a user history (see step 502), then queries or otherwise retrieves data deemed appropriate for the user (see step 504). The layout engine configures a mash-up presentation (e.g., possibly using a mash-up template) in a format selected or constructed as is deemed to be appropriate for the particular user (see step 506), add actions (see step 508) and then displays the mash-up presentation to the user (e.g., in an interactive visualization 124, as shown).

Figure 6:
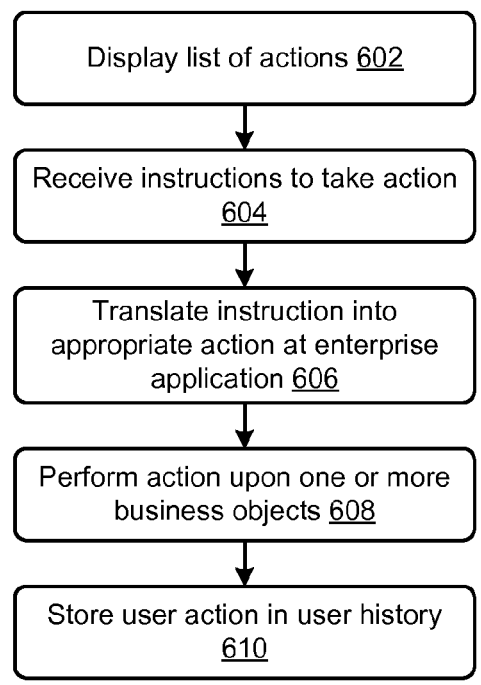
FIG. 6 exemplifies a user interaction prompting approach for prompting the user to interact with an enterprise application as used in systems for relating enterprise information with public information based on a schema and user profile, according to some embodiments.

FIG. 6 exemplifies a user interaction prompting approach 600 for prompting the user to interact with an enterprise application as used in systems to relate unstructured information with structured information based on a schema and user profile. As an option, one or more instances of user interaction prompting approach 600 or any aspect thereof may be implemented in the context of the architecture and functionality of the embodiments described herein. Also, the user interaction prompting approach 600 or any aspect thereof may be implemented in any desired environment.

FIG. 6 shows an approach for the user to take action against data in the enterprise application. Strictly as one example, an interactive visualizations can be configured to display a list of possible actions that can be taken (see step 602). Examples of such actions include creating objects, managing objects, and editing details of objects in the enterprise application. The actions may also relate to external content and tools. For example, the user may choose to take action by sending a message or starting a phone or VoIP call pertaining to a data item/content. Instructions are received from the user to take one or more particular actions (see step 604). This may occur, for example, by identifying the fact that the user has selected an action item from a list of possible actions. In some cases, a user action or instruction is communicated to an enterprise application (see step 606). This may occur, for example, when issuing the appropriate call into the enterprise application using an application programming interface (API) to perform the desired action upon one or more business objects. The indicated action or actions are then performed upon a user action being initiated over a business object(s) within the enterprise application (see step 608). Any user action can be communicated to a BI and can be stored in a user history (see step 610).

Figure 7A:
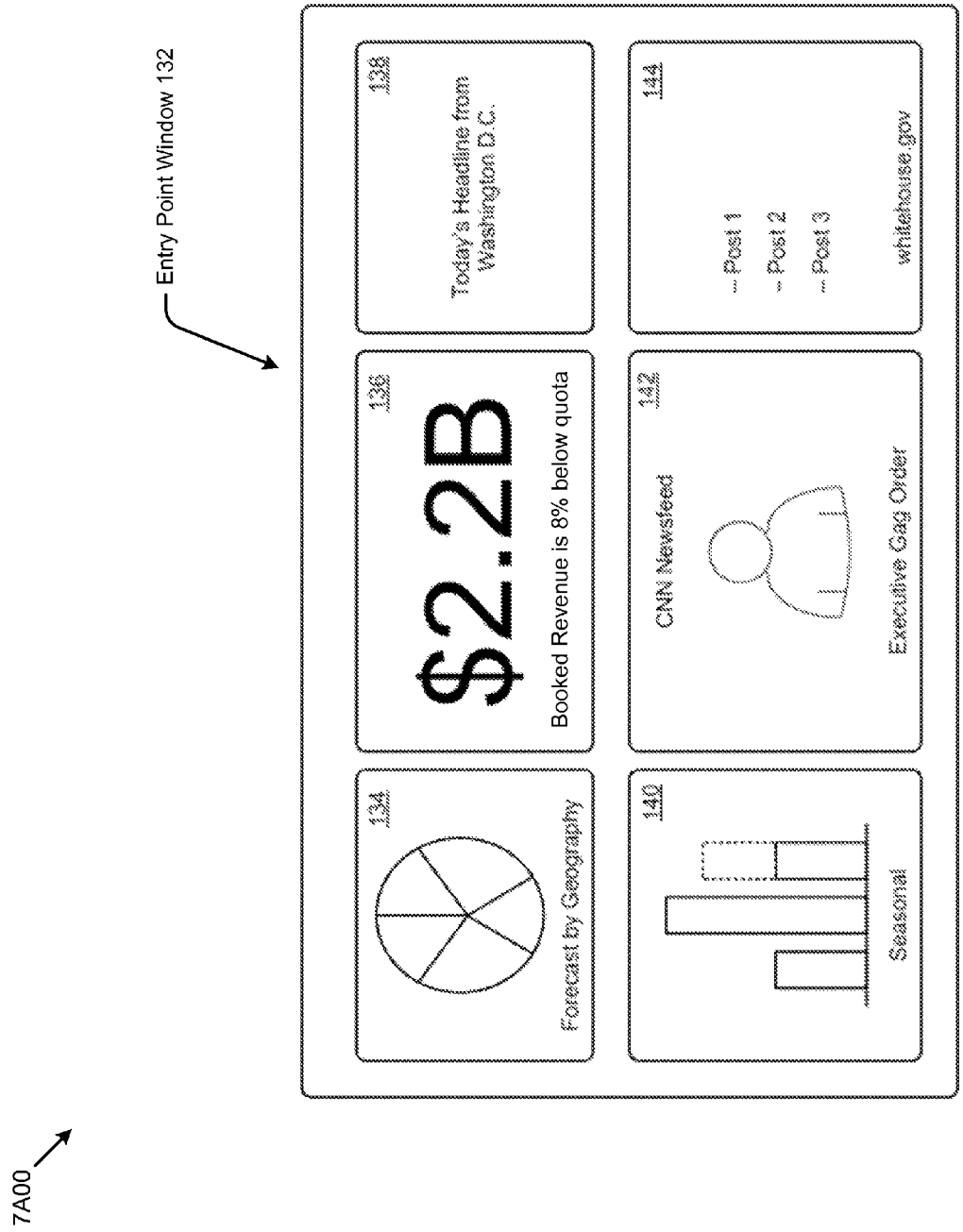
FIG. 7A depicts an application entry point as used in systems for relating enterprise information with public information based on a schema and user profile, according to some embodiments.

FIG. 7A depicts an application entry point 7A00 as used in systems for relating enterprise information with public information based on a schema and user profile. As an option, one or more instances of application entry point 7A00 or any aspect thereof may be implemented in the context of the architecture and functionality of the embodiments described herein. Also, the application entry point 7A00 or any aspect thereof may be implemented in any desired environment.

FIGS. 7A-7D provide illustrative examples. Consider a scenario pertaining to an individual who is a sales executive ("Brandon") with BigCo, Inc. Corporation. BigCo, Inc. is a holding company with two lines of business: cosmetics and pharmaceuticals. The individual works for the pharmaceuticals ("Pharma") division, and the BigCo, Inc. Pharma sales divisions are located in many places around the world. Further assume that the individual's job is to oversee sales globally.

FIG. 7A, illustrates an entry point window 132 within a briefing interface according to one particular embodiment. From this entry point window 132, a user can see (a) a synopsis of an article/opinion on what Washington's machinations might mean for pharmaceuticals (see headline 138) (b) newsfeed headline 142 pertaining to a gag order on several Pharma executives, and (c) posts 144 from whitehouse.gov that are in response to the newsfeed. The foregoing is merely one example. The entry point window 132 might comprise additional presentations, for example, a news article that provides an overview of the drug industry in India; an email note from a colleague on her first day at a conference in Singapore; and a social media post from another colleague highlighting that a competitor has a problem with the FDA. The aforementioned content is gathered, for example, by accessing Brandon's user profile to identify Brandon's attributes (e.g., Brandon's role in the organization, his interests, and his connections, such as his connections from a social media site), then retrieving the data from applicable structured sources (e.g., enterprise data) and from unstructured sources (e.g., publicly-available information). Additionally, as an option, the entry point window 132 can provide topics and metrics that Brandon may choose to monitor on a regular basis. The example of FIG. 7A might be augmented to show, for example, top selling products, a current representation of quarterly sales-to-street consensus, and a main page link to the BigCo, Inc. corporate site showing stock price and real-time quotes of selected market indexes.

Figure 7B:
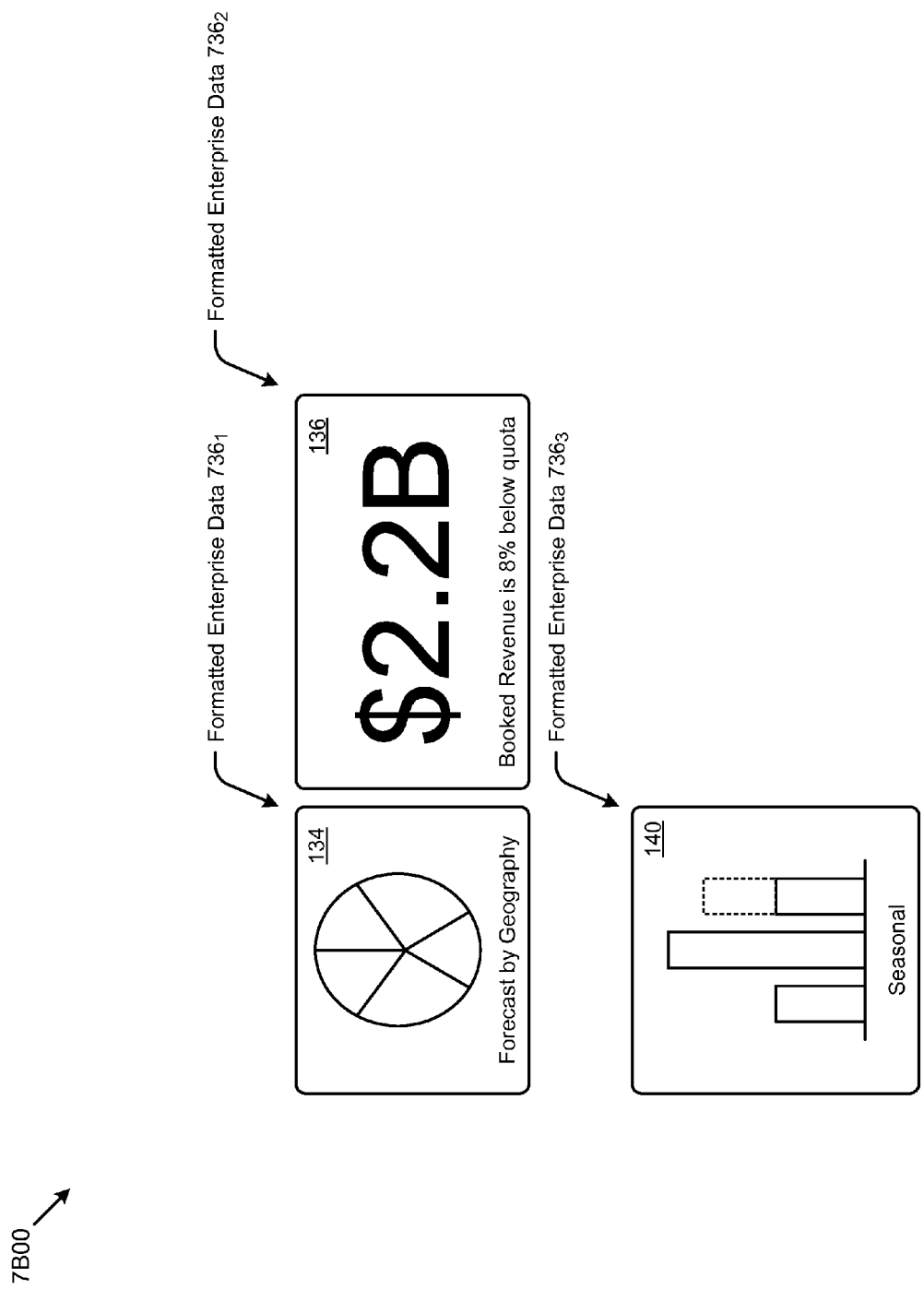
FIG. 7B depicts annotated summary data as used in systems for relating enterprise information with public information based on a schema and user profile, according to some embodiments.

FIG. 7B depicts annotated summary data 7B00 as used in systems for relating enterprise information with public information based on a schema and user profile. As an option, one or more instances of annotated summary data 7B00 or any aspect thereof may be implemented in the context of the architecture and functionality of the embodiments described herein. Also, the annotated summary data 7B00 or any aspect thereof may be implemented in any desired environment.

Referring again to the foregoing FIG. 7B, a portion of the entry point window catches Brandon's attention. Specifically, and as shown, a business intelligence application returns summary data which is presented in the form of formatted enterprise data (e.g., formatted enterprise data $736_1$, formatted enterprise data $736_2$, formatted enterprise data $736_3$). The headline reads "Booked revenue is $2.2 B, 8% below quota". Brandon interacts with the interface to obtain more information about this headline item. For example, the interface can be configured to allow the user to click on a headline to learn more (e.g., to follow a forward link).

Figure 7C:
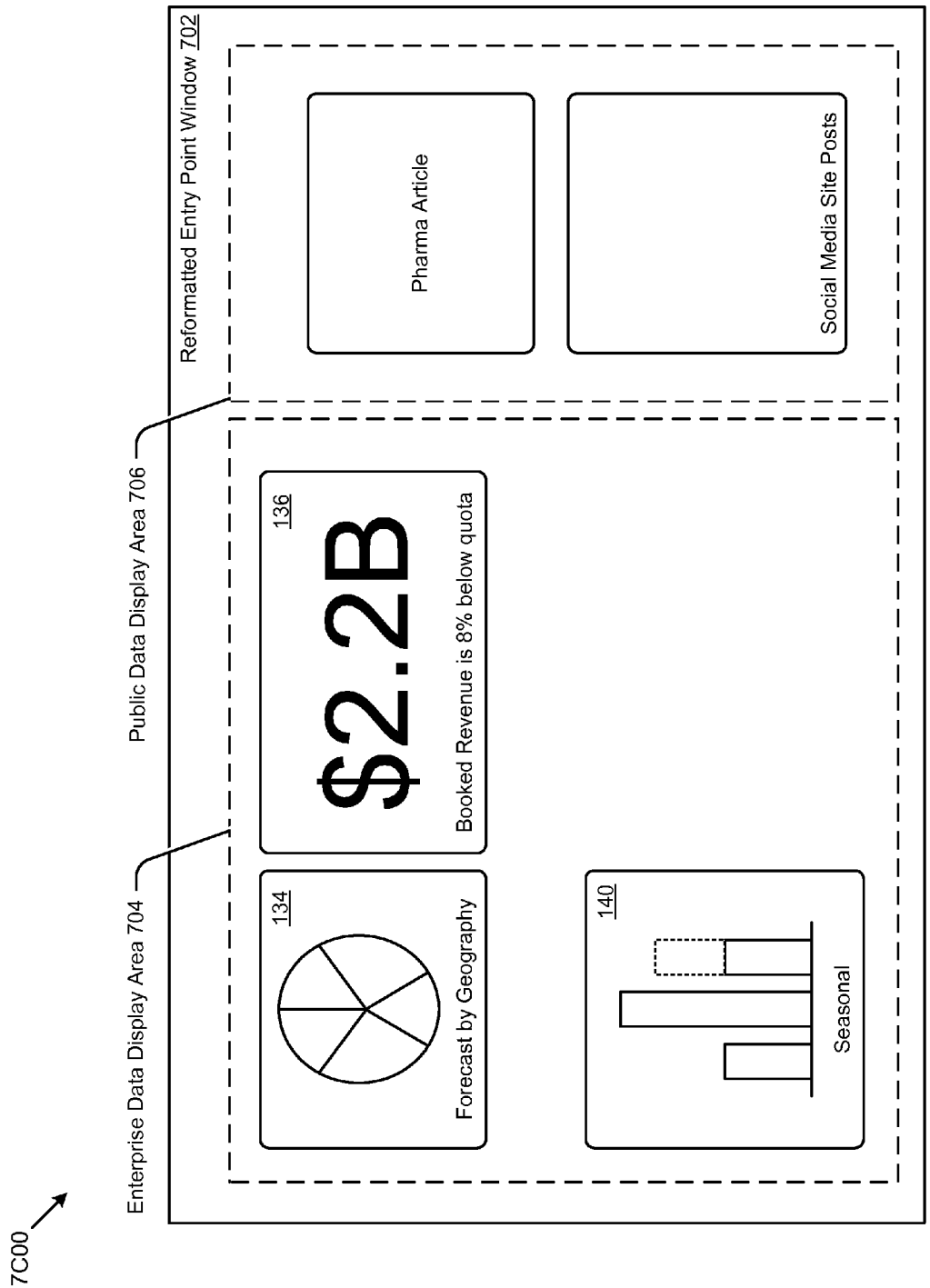
FIG. 7C is a graphic depiction of a mash-up presentation using annotated summary data 7B00 resulting from relating unstructured information with structured information based on a schema and user profile, according to some embodiments.

FIG. 7C is a graphic depiction of a mash-up presentation 7C00 using annotated summary data 7B00 resulting from relating unstructured information with structured information based on a schema and user profile. As an option, one or more instances of mash-up presentation 7C00 or any aspect thereof may be implemented in the context of the architecture and functionality of the embodiments described herein. Also, the mash-up presentation 7C00 or any aspect thereof may be implemented in any desired environment.

FIG. 7C illustrates an example interface that can be displayed to provide more information. An interface can be provided to allow interactive visualization. This example shows several techniques that promote the use of interactive visualizations enabling users to spontaneously explore information. For example, user interaction with an initially-presented mash-up presentation might be reformatted based on the interaction (see reformatted entry point window 702), and such reformatting might present some of the mash-up information more prominently (or remove some mash-up information). Or, user interaction with an initially-presented mash-up presentation might cause reformatting so as to enlarge an enterprise data display area (or shrink), and/or to enlarge (or shrink) a public data display area 706.

Other portions of the interface facilitates multidimensional data exploration in the context of a user's interests. More specifically, Brandon may use the mash-up presentation 7C00 to review various items of financial information, such as revenue booked by lines of business, territory, etc. The associated news articles also provide related information reviewed by Brandon in conjunction with the financial information. For example, news articles and social network messages (e.g., tweets) may be displayed that pertain to some or all of the products reviewed by Brandon.

FIG. 7D is a graphic depiction of action prompts 7D00 for taking action based on data resulting from relating unstructured information with structured information based on a schema and user profile, according to some embodiments. As an option, one or more instances of action prompts 7D00 or any aspect thereof may be implemented in the context of the architecture and functionality of the embodiments described herein. Also, the action prompts 7D00 or any aspect thereof may be implemented in any desired environment.

Based upon Brandon's review of the data, he may decide to take certain actions. FIG. 7D displays lists of possible/suggested actions that may be taken pertaining to the reviewed data/business objects. For example, Brandon may decide to take action by sending a message to a colleague about the data. A suggestion of a data-driven action can pop-up during user perusal of the interactive visualizations. For example, if the visualization is focused on "China" then suggested action might be to "Edit Territory Details: Asia Pacific". Or, as another example, if the visualization is focused on "Portugal" the suggested action might be "Edit Territory Details: Europe". The actions depicted are purely exemplary and other actions and/or reasons for an action suggestion are possible.

In some embodiments, the interface comprises a touch-enabling interactive sunburst with adjacent table widget for multi-dimensional data. The interface may also provide for a touch enabling combination dimension/filter bar control for multi-dimensional interactive data visualization within the mash-up presentation. The interactive visualizations enable a user to explore information in context. In addition, a list of suggested actions can be automatically compiled and presented based on information in the view.

Therefore, what has been described is an improved approach to implement an intelligent entry point for enterprise applications. Some embodiments describe the ability to mash up BI data and text. Entities and/or dimensions can be extracted from text and business intelligence applications and related to each other for display of relevant relationships and suggestions of relevant actions.

Numerous advantages are provided by embodiments of the disclosure. A combination of some/all of the above features provides an innovative solution for accessing information. The information can be pulled from multiple sources, where the sources are of different types and include any combination of structured/semi-structured/unstructured information, as well as internal/external and personal/public information. The items of information can be from different sources and of different types and are automatically related to each other. In addition, the information can be automatically related to the user. Analytic information can be displayed on an as-needed basis driven by business conditions (alerts). In addition, information can be sequenced based on how it is ranked in terms of relevance to the user and its popularity. The rank can be based at least in part on machine learning of user behavior, and behavior of people in a similar job role or with a similar profile.

The solution increases user efficiency by providing an efficient and timely way to obtain, identify, and relate topics that are relevant to the user such that the user can quickly comprehend the state of their business and use comprehension to facilitate business decisions.

Additional Embodiments of the Disclosure

Additional Practical Application Examples

Figure 8:
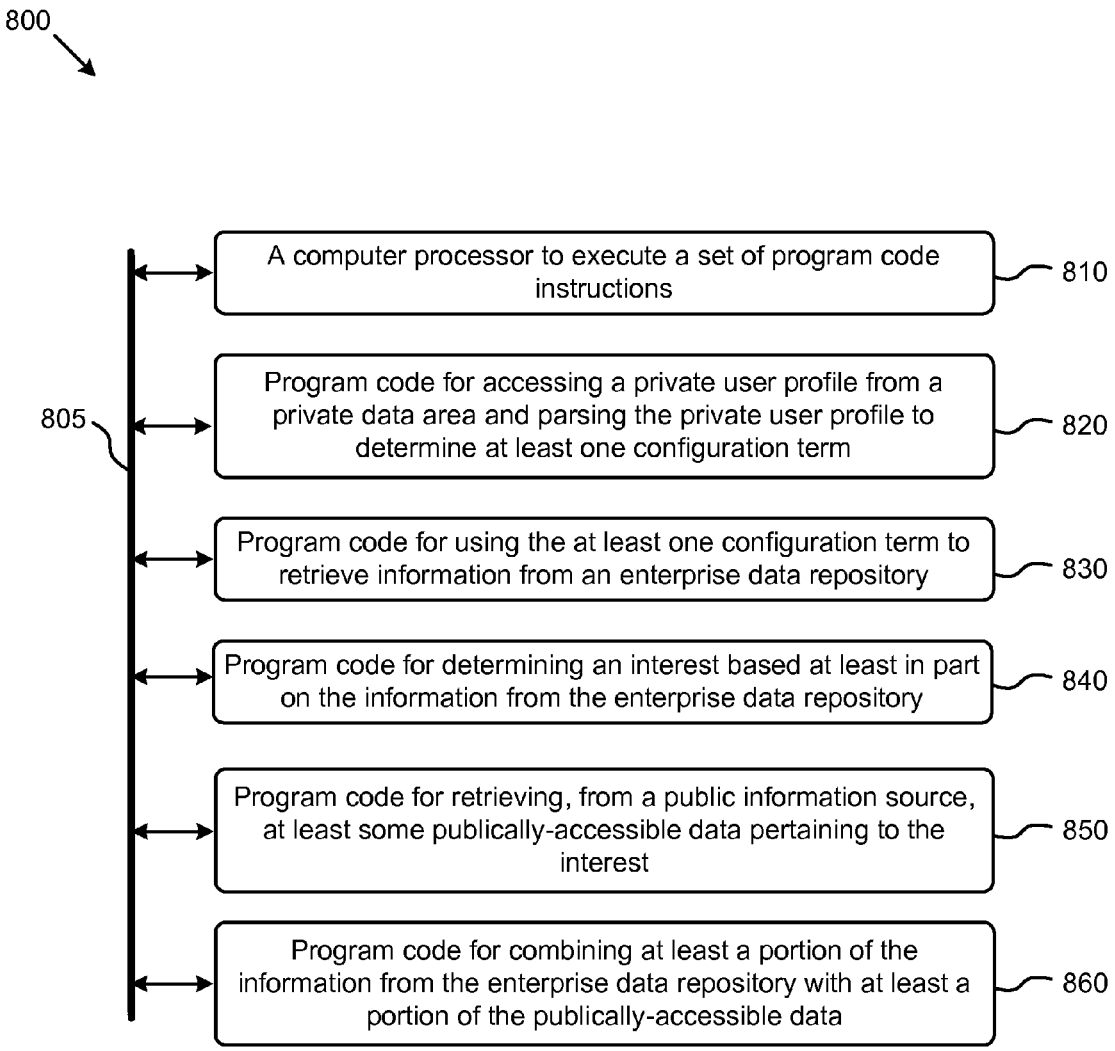
FIG. 8 is a block diagram of a system for relating enterprise information with public information based on a schema and user profile, according to some embodiments.

FIG. 8 is a block diagram of a system for relating enterprise information with public information based on a schema and user profile, according to some embodiments. FIG. 8 depicts a block diagram of a system to perform certain functions of a computer system. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor configured to execute a set of program code instructions (see module 810) and modules for accessing memory to hold program code instructions to perform: accessing a private user profile from a private data area and parsing the private user profile to determine at least one configuration term (see module 820); using the at least one configuration term to retrieve information from an enterprise data repository (see module 830); determining an interest based at least in part on the information from the enterprise data repository (see module 840); retrieving, from a selected public information source, at least some publically-accessible data pertaining to the interest (see module 850); and combining at least a portion of the information from the enterprise data repository with at least a portion of the publically-accessible data (see module 860).

Figure 9:
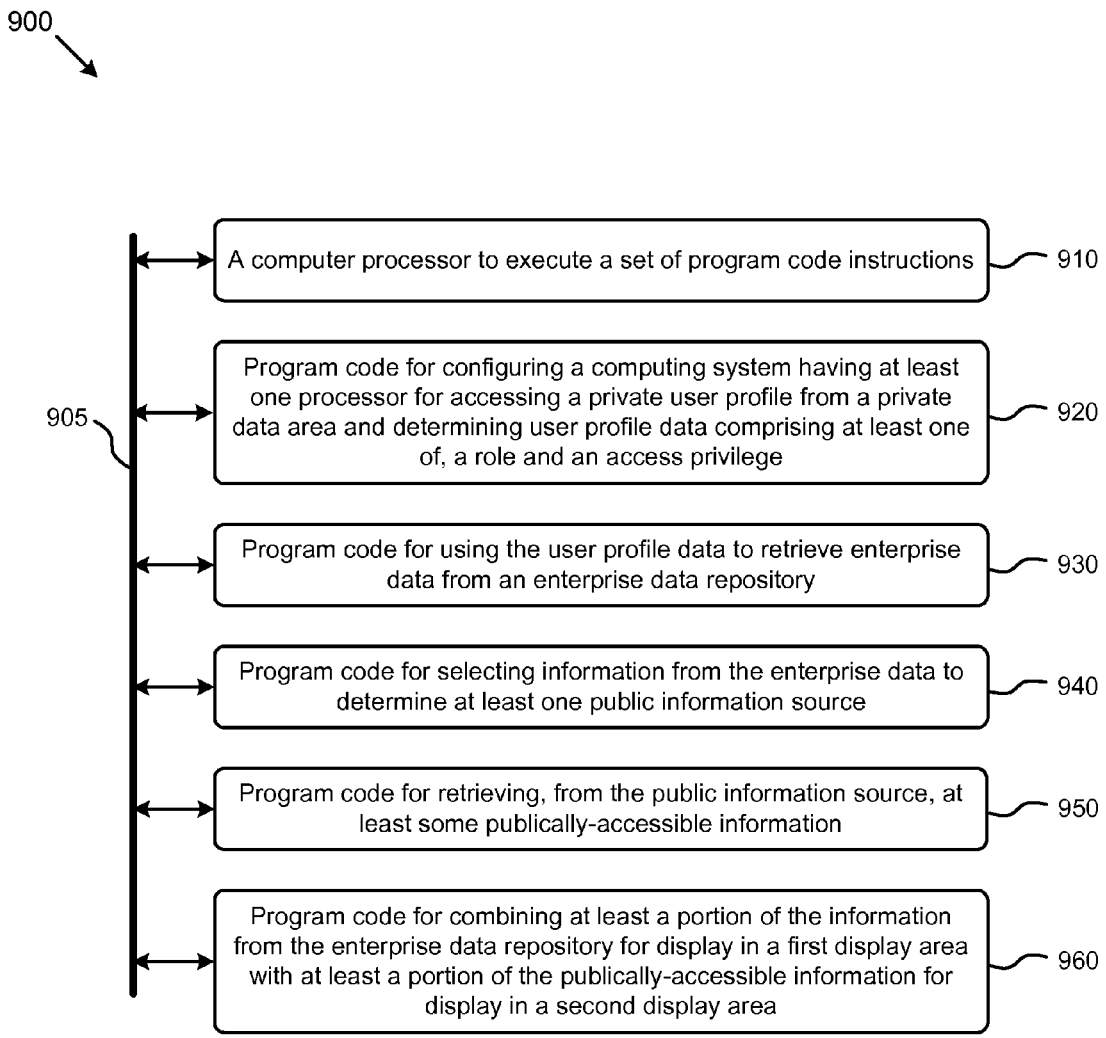
FIG. 9 is a block diagram of a system for relating enterprise information with public information based on a schema and user profile, according to some embodiments.

FIG. 9 is a block diagram of a system for relating enterprise information with public information based on a schema and user profile, according to some embodiments. As an option, the present system 900 may be implemented in the context of the architecture and functionality of the embodiments described herein. Of course, however, the system 900 or any operation therein may be carried out in any desired environment. As shown, system 900 comprises at least one processor and at least one memory, the memory serving to store program instructions corresponding to the operations of the system.

As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims. The embodiment of FIG. 9 implements a portion of a computer system, shown as system 900, comprising a computer processor to execute a set of program code instructions (see module 910) and modules for accessing memory to hold program code instructions to perform the steps of: accessing a private user profile from a private data area and determining user profile data comprising at least one of, a role and an access privilege (see module 920); using the user profile data to retrieve enterprise data from an enterprise data repository (see module 930); selecting information from the enterprise data to determine at least one public information source (see module 940); retrieving, from the public information source, at least some publically-accessible information (see module 950); and combining at least a portion of the information from the enterprise data repository for display in a first display area with at least a portion of the publically-accessible information for display in a second display area (see module 960).

System Architecture Overview

Additional System Architecture Examples

FIG. 10 depicts a block diagram of an instance of a computer system 1000 suitable for implementing embodiments of the present disclosure. Computer system 1000 includes a bus 1006 or other communication mechanism for communicating information, which interconnects subsystems and devices, such as a processor 1007, a system memory 1008 (e.g., RAM), a static storage device (e.g., ROM 1009), a disk drive 1010 (e.g., magnetic or optical), a data interface 1033, a communication interface 1014 (e.g., modem or Ethernet card), a display 1011 (e.g., CRT or LCD), input devices 1012 (e.g., keyboard, cursor control), and an external data repository 1031.

According to one embodiment of the disclosure, computer system 1000 performs specific operations by processor 1007 executing one or more sequences of one or more instructions contained in system memory 1008. Such instructions may be read into system memory 1008 from another computer readable/usable medium, such as a static storage device or a disk drive 1010. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1000. According to certain embodiments of the disclosure, two or more computer systems 1000 coupled by a communications link 1015 (e.g., LAN, PTSN, or wireless network) may perform the sequence of instructions required to practice the disclosure in coordination with one another.

Computer system 1000 may transmit and receive messages, data, and instructions, including programs (e.g., application code), through communications link 1015 and communication interface 1014. Received program code may be executed by processor 1007 as it is received and/or stored in disk drive 1010 or other non-volatile storage for later execution. Computer system 1000 may communicate through a data interface 1033 to a database 1032 on an external data repository 1031. A module as used herein can be implemented using any mix of any portions of the system memory 1008, and any extent of hard-wired circuitry including hard-wired circuitry embodied as a processor 1007.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method comprising:
   accessing a private user profile from a private data area and determining user profile data comprising a role, an access privilege, or a user history;
   using the user profile data to retrieve enterprise data from an enterprise data repository;
   selecting information from retrieved enterprise data to determine at least one public information source, wherein the retrieved enterprise data comprise aspects determined from accessing data from the private user profile;
   retrieving, from the public information source, at least some publically-accessible information;
   relating the information from the enterprise data repository and the at least some publically-accessible information using a schema, the information from the enterprise data repository corresponding to the schema and the at least some publically-accessible information not corresponding to the schema, a process for relating the information from the enterprise data repository and the at least some publically-accessible information comprising the steps of:
      extracting dimensions from the schema;
      tagging the at least some publically-accessible information with keywords according to extracted dimensions; and
      relating the information from the enterprise data repository and the at least some publically-accessible information according to the extracted dimensions; and
   combining at least a portion of the information from the enterprise data repository for display in a first display area with at least a portion of the at least some publically-accessible information for display in a second display area.

2. The method of claim 1, wherein the information from the enterprise data repository comprises structured data, and wherein the at least some publically-accessible information is unstructured data.

3. The method of claim 2, wherein relating the structured data with the unstructured data uses a data schema or an extracted entity.

4. The method of claim 1, wherein tagging the at least some publically-accessible information with keywords according to extracted dimensions further comprises presenting the at least some publically-accessible information in a semi-structured format.

5. The method of claim 2, wherein the extracting dimensions from the schema is based at least in part on text passages embedded in the structured data.

6. The method of claim 2, wherein the unstructured data comprises at least one of, a news feed, an RSS feed, a news article, a headline, and a post.

7. The method of claim 6, further comprising retrieving business intelligence information based at least in part on the user profile data.

8. The method of claim 2, wherein the structured data comprises at least one of, a forecast, a quota, and a booking amount.

9. The method of claim 1, further comprising:
   gathering data from the enterprise data repository using relational database queries, where the relational database queries are formed based at least in part on the schema;
   relating aspects within the schema to aspects found from the private user profile or user history;
   storing the schema in a database;
   scoring a portion of the information from the enterprise data and the at least some publically-accessible information based on the private user profile;
   displaying a list of actions response to information presented in the display, wherein the list of actions corresponds to courses of actions based on the information presented in the display; and
   suggesting different courses of actions against the enterprise data.

10. A computer program product embodied in a non-transitory computer readable medium, the computer readable medium having stored thereon a sequence of instructions which, when executed by a processor causes the processor to execute a process, the process comprising:
   accessing a private user profile from a private data area and determining user profile data comprising a role, an access privilege, or a user history;
   using the user profile data to retrieve enterprise data from an enterprise data repository;
   selecting information from retrieved enterprise data to determine at least one public information source, wherein the retrieved enterprise data comprise aspects determined from accessing data from the private user profile;
   retrieving, from the public information source, at least some publically-accessible information;
   relating the information from the enterprise data repository and the at least some publically-accessible information using a schema, the information from the enterprise data repository corresponding to the schema and the at least some publically-accessible information not corresponding to the schema, a process for relating the information from the enterprise data repository and the at least some publically-accessible information comprising the steps of:
      extracting dimensions from the schema;
      tagging the at least some publically-accessible information with keywords according to extracted dimensions; and
      relating the information from the enterprise data repository and the at least some publically-accessible information according to the extracted dimensions; and
   combining at least a portion of the information from the enterprise data repository for display in a first display area with at least a portion of the at least some publically-accessible information for display in a second display area.

11. The computer program product of claim 10, wherein the information from the enterprise data repository comprises structured data, and wherein the at least some publically-accessible information is unstructured data.

12. The computer program product of claim 11, wherein relating the structured data with the unstructured data uses a data schema.

13. The computer program product of claim 11, wherein relating the structured data with the unstructured data uses a data schema or an extracted entity.

14. The computer program product of claim 13, wherein tagging the at least some publically-accessible information with keywords according to extracted dimensions further comprises presenting the at least some publically-accessible information in a semi-structured format.

15. The computer program product of claim 11, wherein the unstructured data comprises at least one of, a news feed, an RSS feed, a news article, a headline, and a post.

16. The computer program product of claim 11, wherein the structured data comprises at least one of, a forecast, a quota, and a booking amount.

17. A system, comprising:
a processor;
a memory comprising computer code executed using the processor, in which a computer code implements:
an enterprise data repository to provide access to a private user profile from a private data area and to determine user profile data comprising at least one of, a role and an access privilege;
a query generator configured to use the user profile data to retrieve enterprise data from the enterprise data repository;
a reasoning engine to selecting information from the retrieved enterprise data to determine at least one public information source, wherein the retrieved enterprise data comprise aspects determined from accessing data from the private user profile;
a data handler to retrieve, from the public information source, at least some publically-accessible information;
a combiner to relate the information from the enterprise data repository and the at least some publically-accessible information using a schema, the information from the enterprise data repository corresponding to the schema and the at least some publically-accessible information not corresponding to the schema, a process for relating the information from the enterprise data repository and the at least some publically-accessible information comprising the steps of:
extracting dimensions from the schema;
tagging the at least some publically-accessible information with keywords according to extracted dimensions; and
relating the information from the enterprise data repository and the at least some publically-accessible information according to the extracted dimensions; and
a layout engine to combining at least a portion of the information from the enterprise data repository for display in a first display area with at least a portion of the publically-accessible information for display in a second display area.

18. A method comprising:
accessing a private user profile from a private data area and determining user profile data comprising at least one of, a role and an access privilege;
using the user profile data to retrieve enterprise data from an enterprise data repository;
selecting information from the retrieved enterprise data to determine at least one public information source, wherein the retrieved enterprise data comprise aspects determined from accessing data from the private user profile;
retrieving, from the public information source, at least some publically-accessible information;
relating the information from the enterprise data repository and the at least some publically-accessible information using a schema, the information from the enterprise data repository corresponding to the schema and the at least some publically-accessible information not corresponding to the schema, a process for relating the information from the enterprise data repository and the at least some publically-accessible information comprising the steps of:
extracting dimensions from the schema;
tagging the at least some publically-accessible information with keywords according to extracted dimensions; and
relating the information from the enterprise data repository and the at least some publically-accessible information according to the extracted dimensions; and
combining at least a portion of the information from the enterprise data repository for display in a first display area with at least a portion of the publically-accessible information for display in a second display area.

19. The method of claim 18, wherein the information from the enterprise data repository comprises structured data, and wherein the at least some publically-accessible information is unstructured data.

* * * * *

UNITED STATES PATENT AND TRADEMARK OFFICE
CERTIFICATE OF CORRECTION

| | | |
|---|---|---|
| PATENT NO. | : 9,740,376 B2 | Page 1 of 1 |
| APPLICATION NO. | : 14/310561 | |
| DATED | : August 22, 2017 | |
| INVENTOR(S) | : Blyumen | |

It is certified that error appears in the above-identified patent and that said Letters Patent is hereby corrected as shown below:

On the Title Page

On page 2, Column 2, under Other Publications, Line 10, delete "Hobokcn:" and insert -- Hoboken: --, therefor.

On page 2, Column 2, under Other Publications, Line 18, delete "Oralce," and insert -- Oracle, --, therefor.

On page 2, Column 2, under Other Publications, Line 28, delete "googlc-maps" and insert -- google-maps --, therefor.

In the Drawings

On sheet 8 of 17, in FIG. 4C, under Reference Numeral 417, Line 1, delete "transfering" and insert -- transferring --, therefor.

In the Specification

In Column 5, Line 23, delete "repository)" and insert -- repository). --, therefor.

In Column 5, Line 24, delete "feeds and" and insert -- feeds, and --, therefor.

In Column 7, Line 48, delete "and or" and insert -- and/or --, therefor.

In Column 12, Lines 2-3, delete "information" and insert -- information. --, therefor.

In Column 14, Line 9, delete "4b00" and insert -- 4B00 --, therefor.

In Column 20, Line 41, delete "PTSN," and insert -- PSTN, --, therefor.

Signed and Sealed this
Tenth Day of July, 2018

Andrei Iancu
*Director of the United States Patent and Trademark Office*